United States Patent
Yamada et al.

(10) Patent No.: US 8,793,455 B2
(45) Date of Patent: Jul. 29, 2014

(54) STORAGE APPARATUS, CONTROL METHOD FOR STORAGE APPARATUS, AND STORAGE SYSTEM

(75) Inventors: Hidenori Yamada, Kita (JP); Takashi Kawada, Yokohama (JP); Naruhiro Oogai, Kawasaki (JP); Yoshinari Shinozaki, Kawasaki (JP); Shinichi Nishizono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 108 days.

(21) Appl. No.: 13/567,287

(22) Filed: Aug. 6, 2012

(65) Prior Publication Data
US 2013/0080724 A1    Mar. 28, 2013

(30) Foreign Application Priority Data
Sep. 27, 2011    (JP) .................................. 2011-211386

(51) Int. Cl.
*G06F 12/00* (2006.01)
(52) U.S. Cl.
USPC ............ 711/162; 711/E12.028; 711/E12.069

(58) Field of Classification Search
USPC .......................................................... 711/162
See application file for complete search history.

(56) References Cited

U.S. PATENT DOCUMENTS

| 2002/0112079 | A1 | 8/2002 | Yamamoto |
| 2004/0088505 | A1 | 5/2004 | Watanabe |
| 2011/0197040 | A1* | 8/2011 | Oogai et al. .................. 711/162 |

FOREIGN PATENT DOCUMENTS

| JP | 2002-312125 | 10/2002 |
| JP | 2004-280779 | 10/2004 |

* cited by examiner

*Primary Examiner* — Reginald Bragdon
*Assistant Examiner* — Hamdy S Ahmed
(74) *Attorney, Agent, or Firm* — Staas & Halsey LLP

(57) ABSTRACT

A storage apparatus includes a memory that stores data groups, a rearranging unit that rearranges a transmission group order of the data groups based on each of storage positions in a storage device provided in a copy destination storage apparatus in which the each of data groups is to be stored, and a transmitting unit that transmits the data groups rearranged by the rearranging unit to the copy destination storage apparatus.

5 Claims, 20 Drawing Sheets

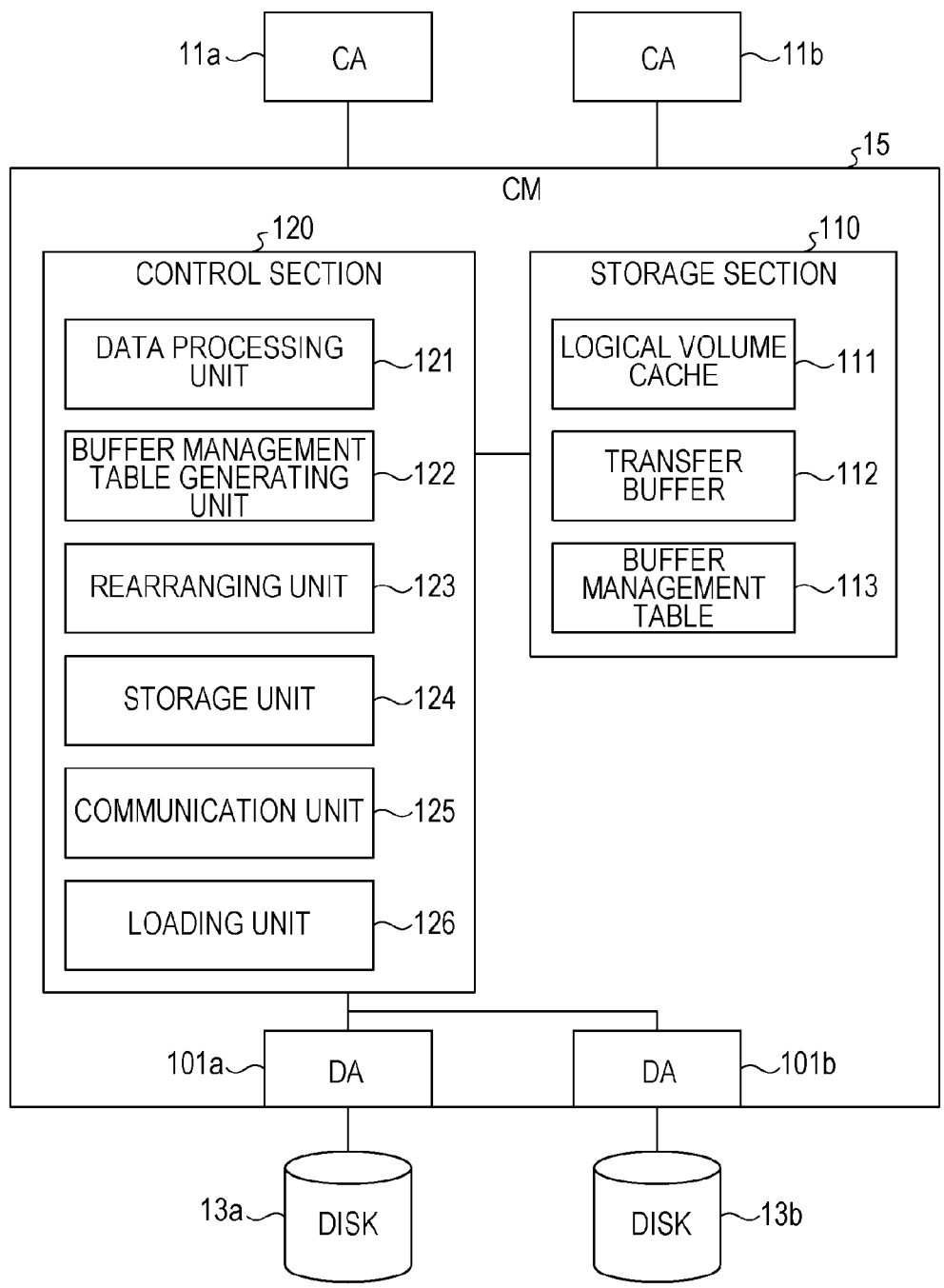

STORAGE APPARATUS, CONTROL METHOD FOR STORAGE APPARATUS, AND STORAGE SYSTEM

CROSS-REFERENCE TO RELATED APPLICATION

This application is based upon and claims the benefit of priority of the prior Japanese Patent Application No. 2011-211386, filed on Sep. 27, 2011, the entire contents of which are incorporated herein by reference.

FIELD

The embodiments discussed herein are related to a storage apparatus, a control method for the storage apparatus, and a storage system.

BACKGROUND

Storage apparatuses have the following function. In the case of the occurrence of unexpected accidents, data stored in a certain storage apparatus (copy source storage apparatus) is transferred to a storage apparatus at a remote site (copy destination storage apparatus) and is backed up therein. In this case, if data groups transferred to the copy destination storage apparatus are not written in the same order as the data groups were written into the copy source storage apparatus, data consistency between the copy source storage apparatus and the copy destination storage apparatus is lost.

Accordingly, the copy source storage apparatus transfers data groups to the copy destination storage apparatus such that the consistency of the order of the data groups is guaranteed in the copy destination storage apparatus. For example, the copy source storage apparatus stores update data received from a server in a dedicated memory which is divided into units of generations, each unit including a certain capacity, and transfers groups of the update data in units of generations to the copy destination storage apparatus. Then, the copy destination storage apparatus receives the data groups in units of generations from the copy source storage apparatus, and loads the received data groups into a storage device of the copy destination storage apparatus. In this manner, the copy source storage apparatus transfers data groups in units of generations, thereby guaranteeing the consistency of the order of data groups.

A technique for copying data while guaranteeing the consistency of the order of data groups is utilized, not only in an open system constructed using a Unix (trademark)/Intel (trademark) Architecture (IA) server, but also in a system constructed using a mainframe (hereinafter referred to as a "mainframe system").

Examples of the above-described related art are disclosed in Japanese Laid-open Patent Publication Nos. 2002-312125 and 2004-280779.

However, in the above-described related art, it takes time to load transferred data into a copy destination storage apparatus. More specifically, in a copy destination storage apparatus, every time a disk is accessed, a position in the disk is specified and a disk head is moved to the specified position. Since the copy destination storage apparatus writes data groups into the disk in the order in which the data groups have been stored in a dedicated memory, it randomly accesses the disk. Accordingly, the disk head randomly moves every time a data item is written into the disk. As a result, in the copy destination storage apparatus, when accessing the disk, it takes time to move the disk head, and thus, it takes time to load data.

SUMMARY

According to an aspect of the embodiments, a storage apparatus includes a memory that stores data groups, a rearranging unit that rearranges a transmission group order of the data groups based on each of storage positions in a storage device provided in a copy destination storage apparatus in which the each of data groups is to be stored, and a transmitting unit that transmits the data groups rearranged by the rearranging unit to the copy destination storage apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a functional block diagram illustrating the configuration of a control module (CM) according to the first embodiment.

DESCRIPTION OF EMBODIMENTS

Embodiments of a storage apparatus, a control method for the storage apparatus, and a storage system will be described below in detail with reference to the accompanying drawings. The following embodiments may be combined appropriately without causing inconsistencies in processing contents among the embodiments.

First Embodiment

The configurations of a storage system, a storage apparatus, control modules (CMs), a processing procedure, and advantages of a first embodiment will be described below with reference to FIGS. 1 through 11.

Configuration of Storage System

Figure 1:
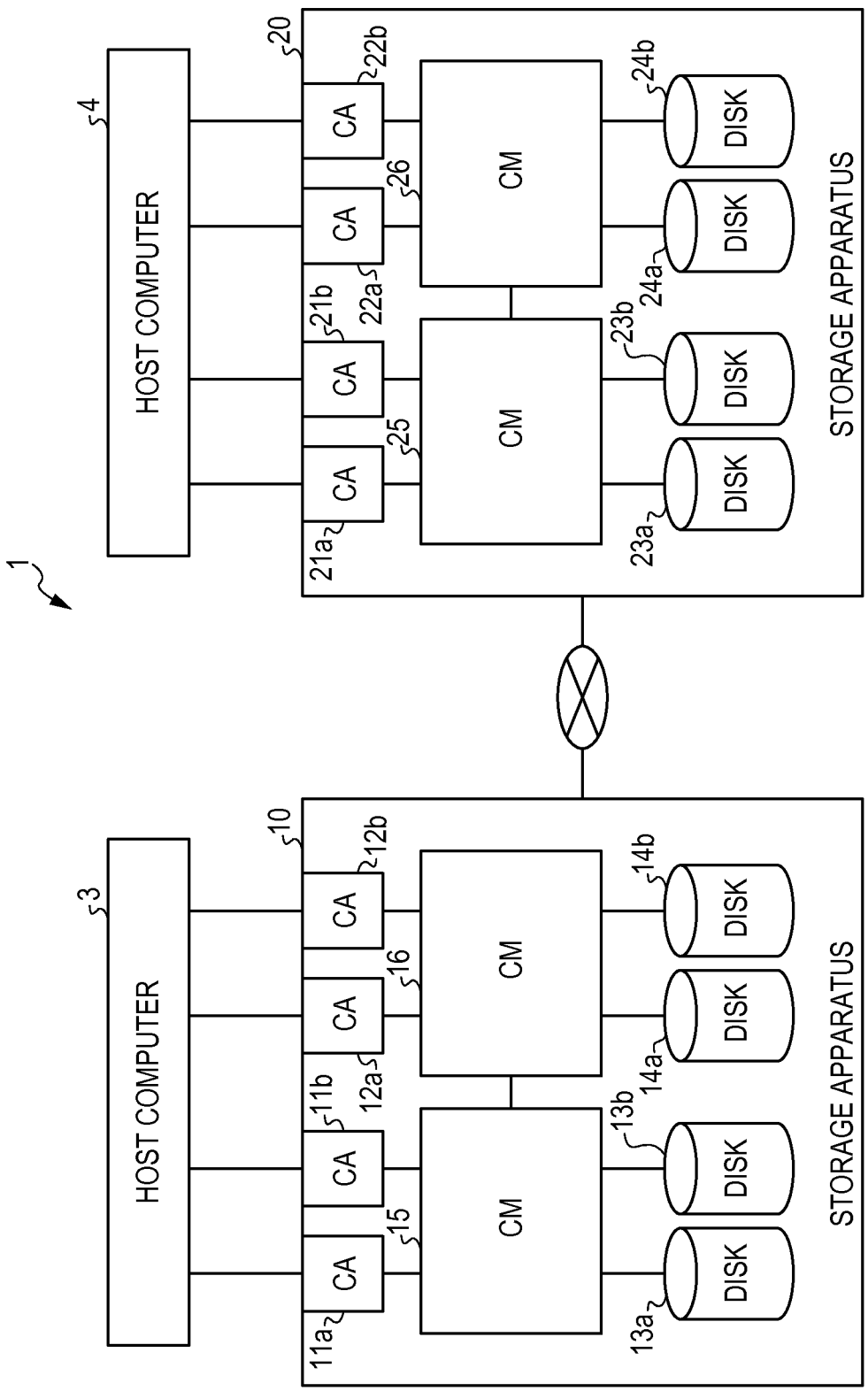
FIG. 1 is a block diagram illustrating the configuration of a storage system according to a first embodiment.

An example of a storage system 1 will be discussed below through illustration of a system to which a mainframe is connected. FIG. 1 is a block diagram illustrating the configuration of the storage system 1 according to the first embodiment. The storage system 1 includes, as illustrated in FIG. 1, host computers 3 and 4 and storage apparatuses 10 and 20. A description will be given below, assuming that the storage apparatus 10 is a copy source storage apparatus and the storage apparatus 20 is a copy destination storage apparatus. The numbers of host computers and storage apparatuses are not restricted to two, and may be changed.

The host computer 3 is connected to the storage apparatus 10 via a network, such as a local area network (LAN). The host computer 4 is connected to the storage apparatus 20 via a network, such as a LAN. The storage apparatus 20 is located in a remote site away from the storage apparatus 10, and the storage apparatuses 10 and 20 are connected to each other via, for example, a storage area network (SAN) such that they may communicate with each other.

The host computer 3 is, for example, a mainframe, and reads and writes data from and into the storage apparatus 10. The host computer 3 also requests the storage apparatus 10 to copy data stored in the storage apparatus 10 onto the storage apparatus 20. The host computer 3 specifies a copy source volume, a copy source logical block address (LBA), a copy destination volume, and a copy destination LBA, details of which will be given later. One LBA has 512 bytes. At the same time as writing data into the storage apparatus 10, the host computer 3 may request the storage apparatus 10 to copy the written data onto the storage apparatus 20.

The host computer 4 reads and writes data from and into the storage apparatus 20. Data read and written by the host computers 3 and 4 from and into the storage apparatuses 10 and 20, respectively, is handled in a standard format called a track. This standard format will be discussed later.

The storage apparatus 10 includes channel adapters (CAs) 11a, 11b, 12a, and 12b, disks 13a, 13b, 14a, and 14b as a storage device, and control modules (CMs) 15 and 16. The CAs 11a, 11b, 12a, and 12b are interfaces with the host computer 3. The disks 13a, 13b, 14a, and 14b construct redundant arrays of inexpensive disks (RAID) and store writing data received from the host computer 3 therein.

The CM 15 controls input/output of data between the host computer 3 and the disks 13a and 13b. The CM 16 controls input/output of data between the host computer 3 and the disks 14a and 14b. The CMs 15 and 16 each include a logical volume cache. In the logical volume cache, data to be read and written from and into the disk 13a or 13b or the disk 14a or 14b in response to a request from the host computer 3 is temporarily stored. The CMs 15 and 16 each include a transfer buffer, which is used when a request to transfer data to the storage apparatus 20 is received from the host computer 3. The detailed configuration of the CMs 15 and 16 will be discussed later.

The storage apparatus 20 includes CAs 21a, 21b, 22a, and 22b, disks 23a, 23b, 24a, and 24b, and CMs 25 and 26. The CAs 21a, 21b, 22a, and 22b are interfaces with the host computer 4. The disks 23a, 23b, 24a, and 24b construct RAID and store writing data received from the host computer 4 or data transferred from the storage apparatus 10 therein.

The CM 25 controls input/output of data between the host computer 4 and the disks 23a and 23b and input/output of data transferred from the storage apparatus 10. The CM 26 controls input/output of data between the host computer 4 and the disks 24a and 24b and input/output of data transferred from the storage apparatus 10. The CMs 25 and 26 each include a logical volume cache. In the logical volume cache, data to be read and written from and into the disk 23a or 23b or the disk 24a or 24a in response to a request from the host computer 4 is temporarily stored. The CMs 25 and 26 each include a transfer buffer, which is used when data has been received from the storage apparatus 10. The detailed configuration of the CMs 25 and 26 will be discussed later.

In the storage system 1 configured as described above, upon receiving from the host computer 3 a request to back up data which has been written into any one of the disks of the storage apparatus 10, the following processing is executed. The storage apparatus 10 transfers data which has been written into one of the disks of the storage apparatus 10 to the storage apparatus 20 which is connected to the storage apparatus 10 via a network.

Upon receiving update data used for updating data written into one of the disks from the host computer 3, the storage apparatus 10 executes the following processing in order to back up data while guaranteeing the consistency of the order of groups of the data. The consistency of the order described herein refers to the order in which data groups are written into the storage apparatus 20, which is a copy destination storage apparatus, in the same order in which the data groups have been written into the storage apparatus 10, which is a copy source storage apparatus.

For example, upon receiving update data from the host computer 3, the storage apparatus 10 stores the update data in a logical volume cache. The storage apparatus 10 then transfers the update data from the logical volume cache to a transfer buffer which is divided into units of generations, each unit including a certain capacity. The storage apparatus 10 then transfers the update data for each generation to the storage apparatus 20.

The storage apparatus 20 stores data received from the storage apparatus 10 in a transfer buffer. The storage apparatus 20 then loads the received data in units of generations from the transfer buffer into the logical volume cache, and stores the received data in one of the disks 23a, 23b, 24a, and 24b.

In the storage system 1, the storage apparatus 10, which is a copy source storage apparatus, allows the storage apparatus 20 to speed up processing for loading data into each of the disks of the storage apparatus 20, by executing the following processing. The storage apparatus 10 first transfers data received from the host computer 3 from the logical volume cache to the transfer buffer and stores the data in the transfer buffer.

Figure 2A:
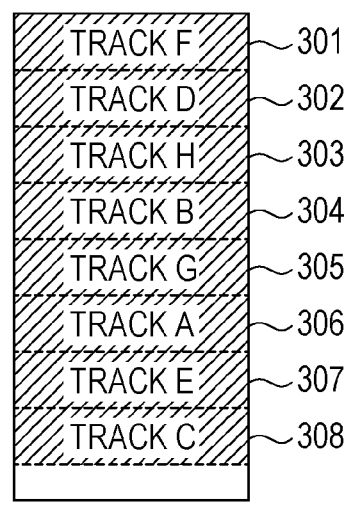
FIG. 2A illustrates an example of the storage state in which groups of writing data received from a host computer are stored in a transfer buffer.

FIG. 2A illustrates an example of the storage state in which data groups received from a host computer are stored in a transfer buffer. As illustrated in FIG. 2A, the storage apparatus 10 stores the data groups in the transfer buffer in the order of a track F 301, a track D 302, a track H 303, a track B 304, a track G 305, a track A 306, a track E 307, and a track C 308.

Figure 2B:
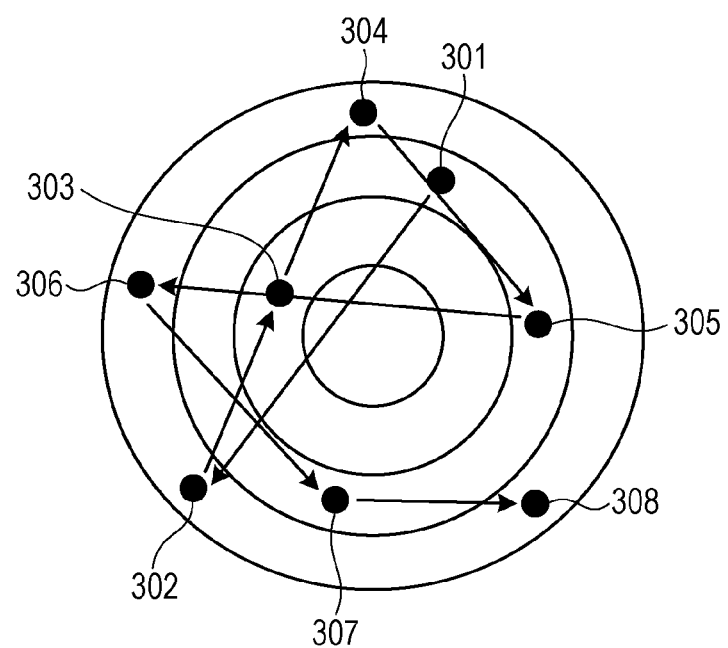
FIG. 2B illustrates a path of a disk head when data groups have been written into a disk in the order illustrated in FIG. 2A.

A description will be given below of a case in which the storage apparatus 10 has transferred data stored in the transfer buffer in the order illustrated in FIG. 2A to the storage apparatus 20. FIG. 2B illustrates a path of the movement of a disk head of the storage apparatus 20 in a case where the data groups were written into a disk of the storage apparatus 10 in the order illustrated in FIG. 2A. When the data groups were written into the disk of the storage apparatus 10 in the order illustrated in FIG. 2A, the disk head of the storage apparatus 20 moves randomly, as indicated by the path illustrated in FIG. 2B. In the storage apparatus 20, therefore, it takes time to load data into the disk.

Figure 2C:
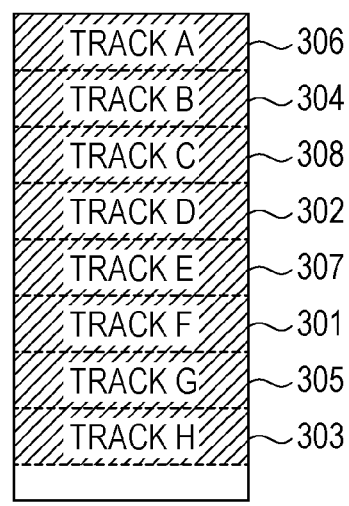
FIG. 2C illustrates an example of the order of data groups rearranged by a storage apparatus.

Accordingly, the storage apparatus 10 rearranges the data groups stored in the transfer buffer in units of tracks. FIG. 2C illustrates an example of the order of the data groups rearranged by the storage apparatus 10. As illustrated in FIG. 2C, the storage apparatus 10 rearranges the data groups in the order of track A 306, track B 304, track C 308, track D 302, track E 307, track F 301, track G 305, and track H 303. The storage apparatus 10 then sends the data groups which have been rearranged, as illustrated in FIG. 2C, to the storage apparatus 20.

Figure 2D:
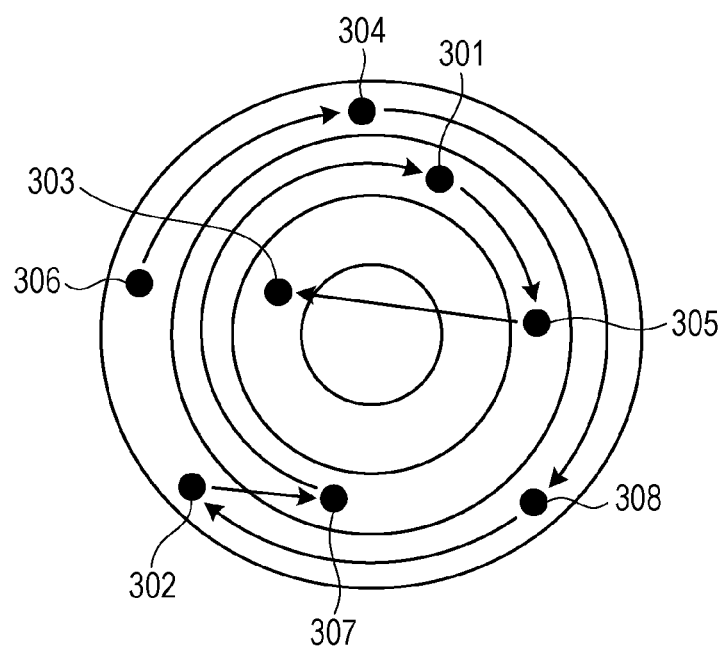
FIG. 2D illustrates a path of a disk head when data groups are written into a disk in the order illustrated in FIG. 2C.

The storage apparatus 20 stores the received data groups in the transfer buffer. The order of the data groups received by the storage apparatus 20 is track A 306, track B 304, track C 308, track D 302, track E 307, track F 301, track G 305, and track H 303. The storage apparatus 20 then loads the received data from the transfer buffer into the logical volume cache, and then, stores the data in a disk. FIG. 2D illustrates a path of the movement of the disk head of the storage apparatus 20 in a case where the data groups were written into the disk of the storage apparatus 10 in the order illustrated in FIG. 2C. In this case, the storage apparatus 20 writes the data groups into the specified disk in the order illustrated in FIG. 2D, thereby allowing the disk head to sequentially access the disk. The consistency of the order of the data groups which is to be reflected in a copy destination volume is guaranteed in units of generations, and even if tracks are rearranged within the same generation, the consistency of the order of the data groups is still guaranteed.

In this manner, the storage apparatus 10 rearranges data groups in the order in which physical storage locations of each disk are sequentially positioned, and then transfers the rearranged data groups. Then, when performing loading processing, the storage apparatus 20 may sequentially access a disk. As a result, in the storage apparatus 20, the time taken to perform processing for loading data into the disk may be reduced.

Configuration of CM

The configuration of the CMs 15, 16, 25, and 26 according to the first embodiment will be discussed below with reference to FIG. 3. Since the configuration of the CMs 15, 16, 25, and 26 is the same, the configuration of the CM 15 will be described below on behalf of the CMs 16, 25, and 26. FIG. 3 is a functional block diagram illustrating the configuration of the CM 15 according to the first embodiment. FIG. 3 illustrates elements of the CM 15 only related to functions of transferring data to be copied. A description will be given below, assuming that the CM 15 has functions both as a copy source storage apparatus and as a copy destination storage apparatus.

The CM 15 includes, as illustrated in FIG. 3, device adapters (DAs) 101a and 101b, a storage section 110, and a control section 120. The DA 101a is an interface with the disk 13a, and the DA 101b is an interface with the disk 13b.

The storage section 110 is a dual inline memory module (DIMM), a dynamic random access memory (DRAM), or a flash memory, and includes a logical volume cache 111, a transfer buffer 112, and a buffer management table 113.

The logical volume cache 111 serves as a cache memory that temporarily stores therein data to be read and written from and into the disk 13a or 13b in response to a request from the host computer 3.

Figure 4:
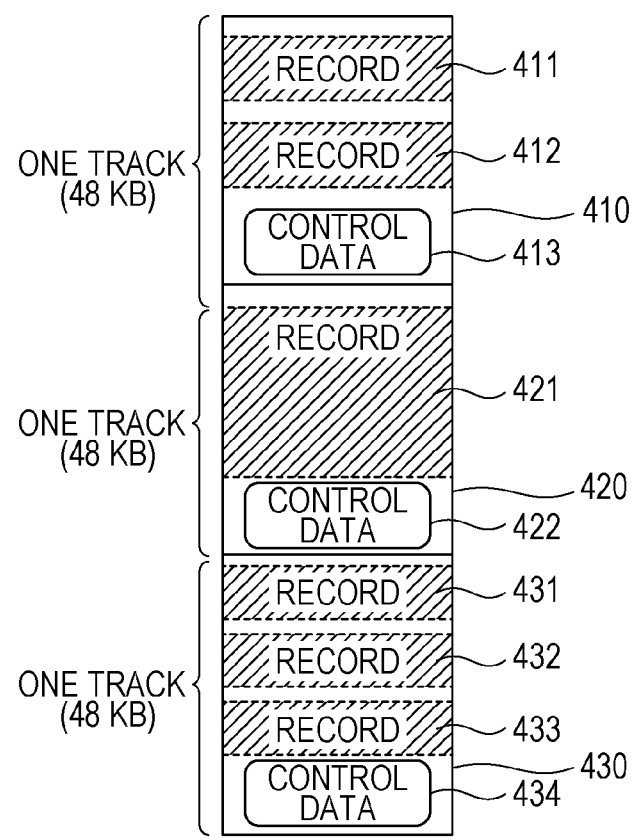
FIG. 4 schematically illustrates the structure of data per track stored in a logical volume cache.

The structure of data stored in the logical volume cache 111 will be described below with reference to FIG. 4. FIG. 4 schematically illustrates the structure of data per track stored in the logical volume cache 111.

As illustrated in FIG. 4, in each track, data is stored in units called records. In FIG. 4, the structure of data for three tracks, i.e., tracks 410, 420, and 430, is illustrated. The track 410 includes records 411 and 412. The track 420 includes a record 421. The track 430 includes records 431, 432, and 433.

Control data 413, 422, and 434 are added to the tracks 410, 420, and 430, respectively, and each of the control data 413, 422, and 434 includes internal information concerning tracks, such as the number of records within a track and the data length of a record.

The control data added to a track will be discussed below. The control data includes information, such as the cylinder number, the head number, the auxiliary flag, the total number of records, the head record number, and the data length.

The cylinder number is the cylinder number of a track. The head number is the head number of a track. The auxiliary flag is the state of a track, e.g., information that the record length in a track is a fixed length or a variable length. The head record number is the head record number of a track. The total number of records is the total number of records of a track. The data length is the number of blocks of a record.

The control data of each track is stored in the final LBA of the associated track. In this manner, by referring to control data, the storage apparatus 10 processes reading and writing of data from and into a track at high speed.

Referring back to FIG. 3, the transfer buffer 112 stores transfer data in units of generations, each unit including a size of 8 MB. It is possible to set the number of generations in the transfer buffer 112 as desired. The transfer buffer 112 is controlled such that the same track is not stored in one generation twice.

Figure 5A:
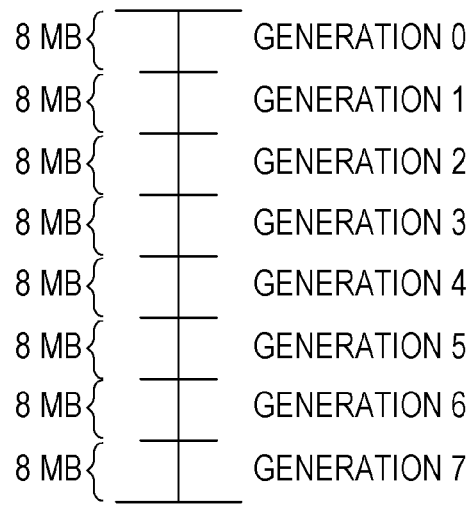
FIG. 5A schematically illustrates the structure of data stored in a transfer buffer.

FIG. 5A schematically illustrates the structure of data stored in the transfer buffer 112. A description will be given below, assuming that the size of the transfer buffer 112 is set to be 128 MB, and half of 128 MB, i.e., 64 MB, is usable due to duplexing of the transfer buffer 112.

As illustrated in FIG. 5A, 64 MB, which is usable in the transfer buffer 112, is divided into eight portions, each including a size of 8 MB. Then, each divided portion forms a generation. In the example illustrated in FIG. 5A, the transfer buffer 112 is divided into 8 generations from generation 0 to generation 7.

Figure 5B:
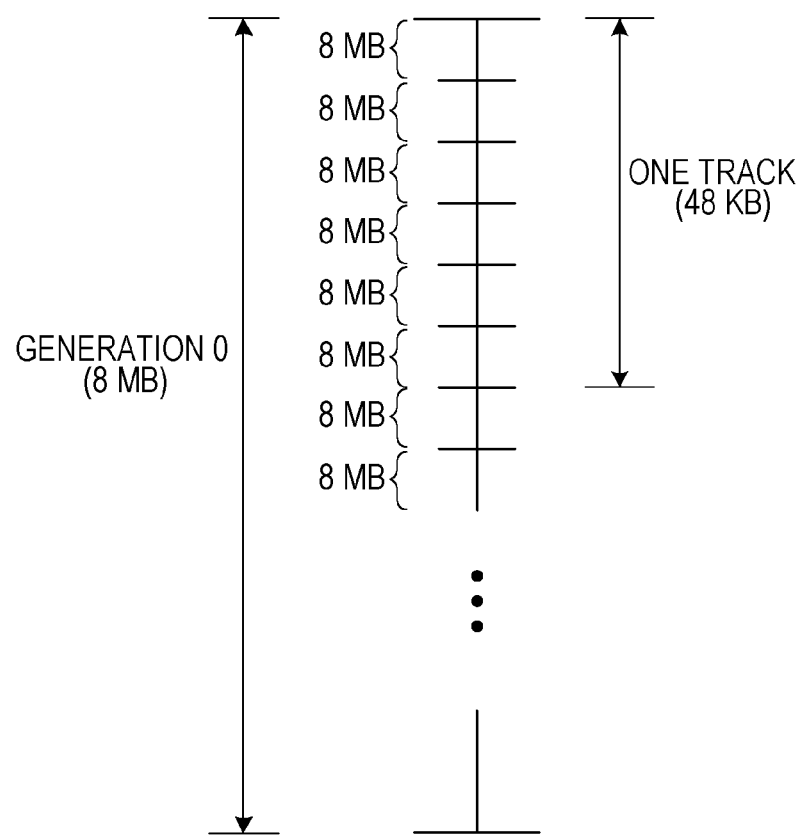
FIG. 5B schematically illustrates the structure of data for one generation stored in a transfer buffer.

FIG. 5B schematically illustrates the structure of data for one generation stored in the transfer buffer 112. As illustrated in FIG. 5B, each generation is divided into 8 KB portions, and 48 KB forms one track. Each generation includes 166 tracks, each track including 48 KB.

The buffer management table 113 stores information concerning a position in a disk provided in a copy source storage apparatus in which data to be transferred is stored and concerning a position in a disk provided in a copy destination storage apparatus in which the data is to be stored. The buffer management table 113 is created for each group of 16 LBAs, i.e., 8 KB, by a buffer management table generating unit 122.

Figure 6:
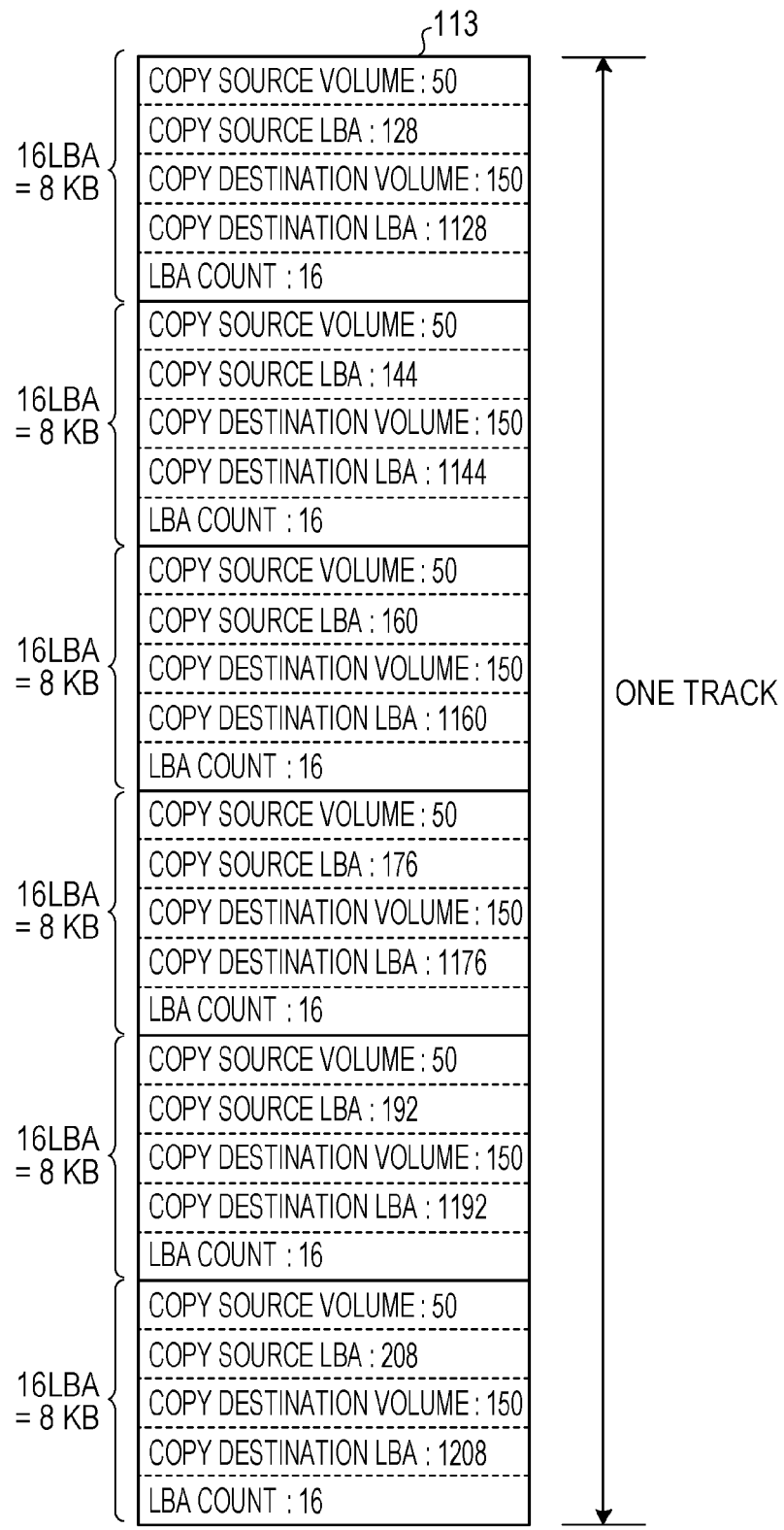
FIG. 6 illustrates an example of information to be stored in a buffer management table.

An example of information to be stored in the buffer management table 113 will be described below with reference to FIG. 6. In FIG. 6, information concerning one track is illustrated. That is, since the buffer management table 113 is generated in units of 8 KB, six groups of information are included in one track.

As illustrated in FIG. 6, the buffer management table 113 stores therein information groups, such as the copy source volume, the copy source LBA, the copy destination volume, the copy destination LBA, and the LBA count, in association with one another.

The copy source volume indicates information for identifying a logical volume of a copy source storage apparatus. The copy source LBA indicates the position in a copy source storage apparatus in which data is stored.

The copy destination volume indicates information for identifying a logical volume of a copy destination storage apparatus. The copy destination LBA indicates the position in a copy destination storage apparatus in which data is stored.

The LBA count indicates the number of LBAs included in each unit of 8 KB. In the first embodiment, the LBA count indicates 16.

Referring back to FIG. 3, the control section 120 is, for example, a central processing unit (CPU), and includes a data processing unit 121, the buffer management table generating unit 122, a rearranging unit 123, a storage unit 124, a communication unit 125, and a loading unit 126.

The data processing unit 121 receives data from the host computer 3, and writes the received data into the logical volume cache 111. The data processing unit 121 then informs the host computer 3 of the completion of writing of the received data. The data processing unit 121 also reads data stored in the logical volume cache 111 and stores the read data in the disk 13a or 13b.

Additionally, the data processing unit 121 determines whether the amount of data to be written into a certain generation exceeds a given amount. If the data processing unit 121 determines that the amount of data does not exceed the given amount, it continues to receive data from the host computer 3.

In contrast, if the data processing unit 121 determines that the amount of data exceeds the given amount, it requests the rearranging unit 123 to rearrange tracks in the buffer management table 113.

The buffer management table generating unit 122 extracts, from a copy request received from the host computer 3, values indicating the volume and the position in a disk of a copy source storage apparatus including the CM 15 at which data received from the host computer 3 is to be stored.

The buffer management table generating unit 122 then stores the extracted values in the buffer management table 113 in association with the copy source volume and the copy source LBA. The buffer management table generating unit 122 also extracts, from a copy request received from the host computer 3, values indicating the volume and the position in a disk of a copy destination storage apparatus in which data received from the host computer 3 is to be stored. The buffer management table generating unit 122 then stores the extracted values in the buffer management table 113 in association with the copy destination volume and the copy destination LBA.

If it is determined by the data processing unit 121 that the amount of data to be written into a certain generation exceeds the given amount, the rearranging unit 123 rearranges tracks managed in the buffer management table 113. An example of processing for rearranging tracks managed in the buffer management table 113 by the rearranging unit 123 will be discussed below with reference to FIG. 7.

Figure 7:
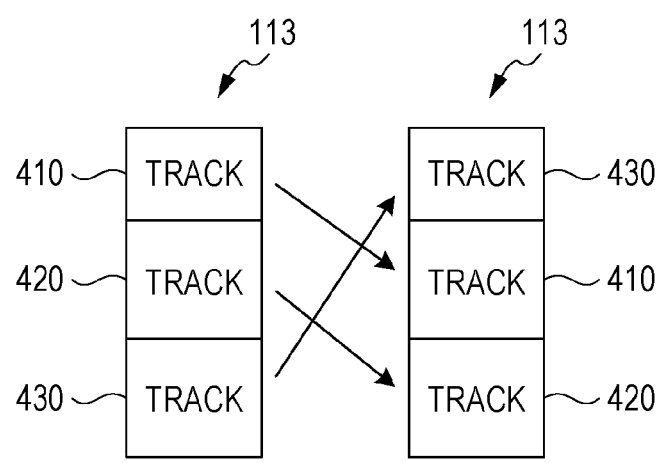
FIG. 7 illustrates an example of processing for rearranging tracks managed in a buffer management table by a rearranging unit.

In the example illustrated in FIG. 7, three tracks, i.e., tracks 410, 420, and 430, managed in the buffer management table 113 are rearranged. A description will be given below, assuming that the copy source LBAs of the track 410 are 1128 through 1208, the copy source LBAs of the track 420 are 980 through 1060, and the copy source LBAs of the track 430 are 1400 through 1480.

The rearranging unit 123 rearranges tracks managed in the buffer management table 113 so that LBAs of the copy destination storage apparatus are arranged in ascending order. In the example illustrated in FIG. 7, the rearranging unit 123 rearranges the order of the tracks 410, 420, and 430 in the buffer management table 113 to the order the tracks 430, 410, and 420. The rearranging unit 123 then informs the storage unit 124 that the tracks in the buffer management table 113 have been rearranged.

The storage unit 124 sets the storage source address and the storage destination address. The storage source address indicates the address of the logical volume cache 111 at which data is stored. The storage destination address indicates the address of the transfer buffer 112 at which data is to be stored.

Upon receiving from the rearranging unit 123 information that tracks in the buffer management table 113 have been rearranged, the storage unit 124 executes the following processing. The storage unit 124 transfers data from the logical volume cache 111 to the transfer buffer 112 and stores the data therein based on the buffer management table 113 rearranged by the rearranging unit 123. An example of processing for storing data by the storage unit 124 will be described below with reference to FIG. 8.

Figure 8:
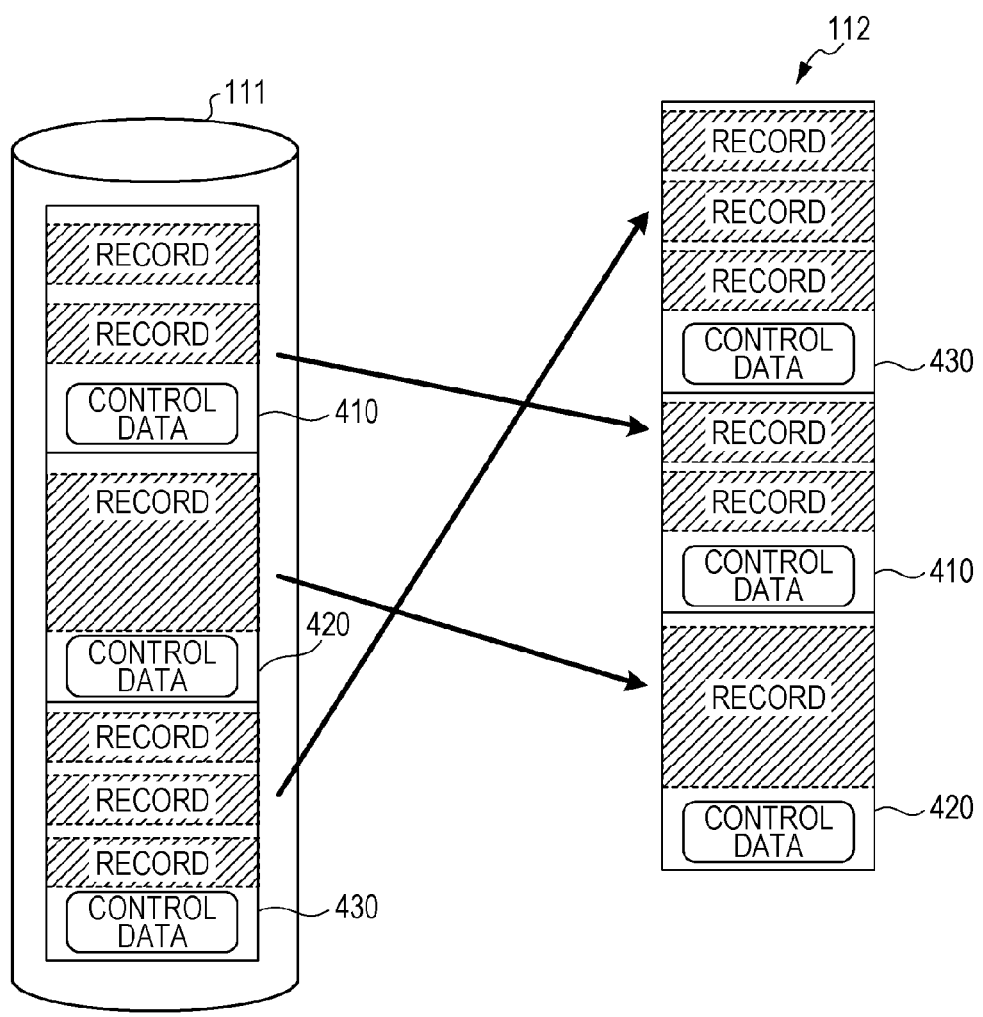
FIG. 8 illustrates an example of processing for storing data by a storage unit.

In the example illustrated in FIG. 8, three tracks, i.e., the tracks 410, 420, and 430, stored in the logical volume cache 111 are to be stored in the transfer buffer 112 by the storage unit 124. In this case, the storage unit 124 utilizes the buffer management table 113 illustrated in FIG. 7 rearranged by the rearranging unit 123.

As illustrated in FIG. 8, the storage unit 124 reads the track 430 from the logical volume cache 111 and stores the track 430 in the transfer buffer 112. In this case, the storage unit 124 stores the track 430 in the set storage destination address, i.e., the address of the transfer buffer 112. Sequentially, the storage unit 124 reads the track 410 from the logical volume cache 111 and stores the track 410 at a position after the track 430 in the transfer buffer 112. The storage unit 124 then reads the track 420 from the logical volume cache 111 and stores the track 420 at a position after the track 410 in the transfer buffer 112.

Upon completion of storing data for one generation in the transfer buffer 112, the storage unit 124 instructs the communication unit 125 to send data stored in the transfer buffer 112 to the copy destination storage apparatus 20.

If data to be transferred is not stored in the logical volume cache 111, the storage unit 124 reads the data to be transferred from the disk 13a or 13b, and first stores the data in the logical volume cache 111 and then stores the data in the transfer buffer 112.

Upon receiving from the storage unit 124 information that data for one generation has been stored in the transfer buffer 112, the communication unit 125 executes the following processing. The communication unit 125 reads data stored in the transfer buffer 112 and sends the read data to a copy destination storage apparatus. The communication unit 125 also sends the buffer management table 113 rearranged by the rearranging unit 123 to the copy destination storage apparatus.

Additionally, upon receiving transfer data from a copy source storage apparatus, the communication unit 125 stores the received data in the transfer buffer 112. The communication unit 125 then informs the loading unit 126 that the received data has been stored in the transfer buffer 112.

Upon receiving from the communication unit 125 information that the received data has been stored in the transfer buffer 112, the loading unit 126 determines whether all groups of data included in a certain generation have been received. If the loading unit 126 determines that not all the groups of data included in a certain generation have been received, it monitors the transfer buffer 112 until all the groups of data have been received.

If the loading unit 126 determines that all the groups of data included in a certain generation have been received, it executes loading processing. For example, the loading unit 126 refers to the buffer management table 113 and sets the loading source address and the loading destination address. The loading source address indicates the address of the transfer buffer 112 at which the data is stored. The loading destination address indicates the address of the logical volume cache 111 at which the data is to be stored. The loading unit 126 then transfers the data stored in the transfer buffer 112 to the logical volume cache 111.

Figure 9:
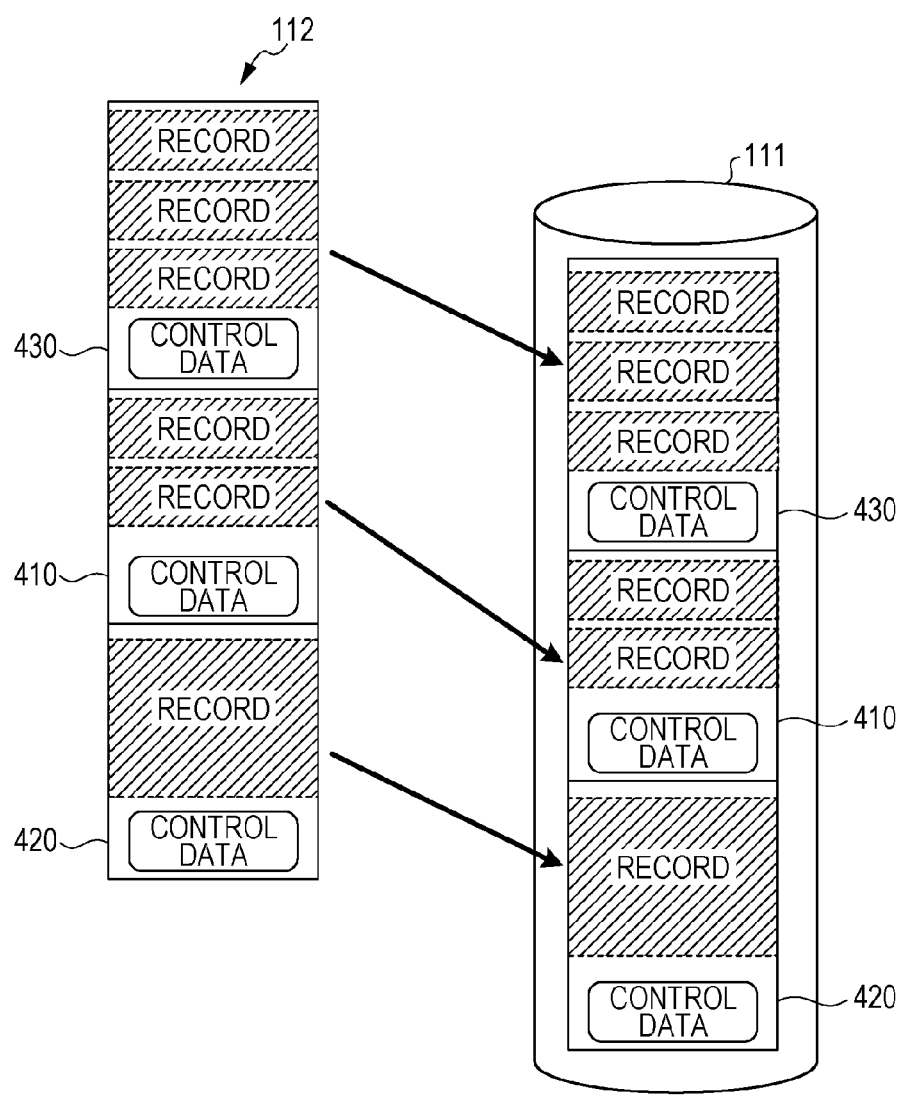
FIG. 9 illustrates an example of processing for loading data by a loading unit.

FIG. 9 illustrates an example of processing for loading data by the loading unit 126. In the example illustrated in FIG. 9, the loading unit 126 loads three tracks, i.e., tracks 410, 420, and 430, into the logical volume cache 111.

As illustrated in FIG. 9, the loading unit 126 loads the track 430 stored in the transfer buffer 112 into the logical volume cache 111. Sequentially, the loading unit 126 loads the track 410 stored in the transfer buffer 112 into the logical volume cache 111. Then, the loading unit 126 loads the track 420 stored in the transfer buffer 112 into the logical volume cache 111.

Processing Procedures Performed by Storage Devices

Processing procedures performed by the storage apparatuses according to the first embodiment will be described below with reference to FIGS. 10 and 11. A processing procedure for storage processing performed by a copy source storage apparatus according to the first embodiment will be discussed below with reference to FIG. 10, and a processing procedure for loading processing performed by a copy destination storage apparatus according to the first embodiment will be discussed below with reference to FIG. 11.

Storage Processing in Copy Source Storage Device

Figure 10:
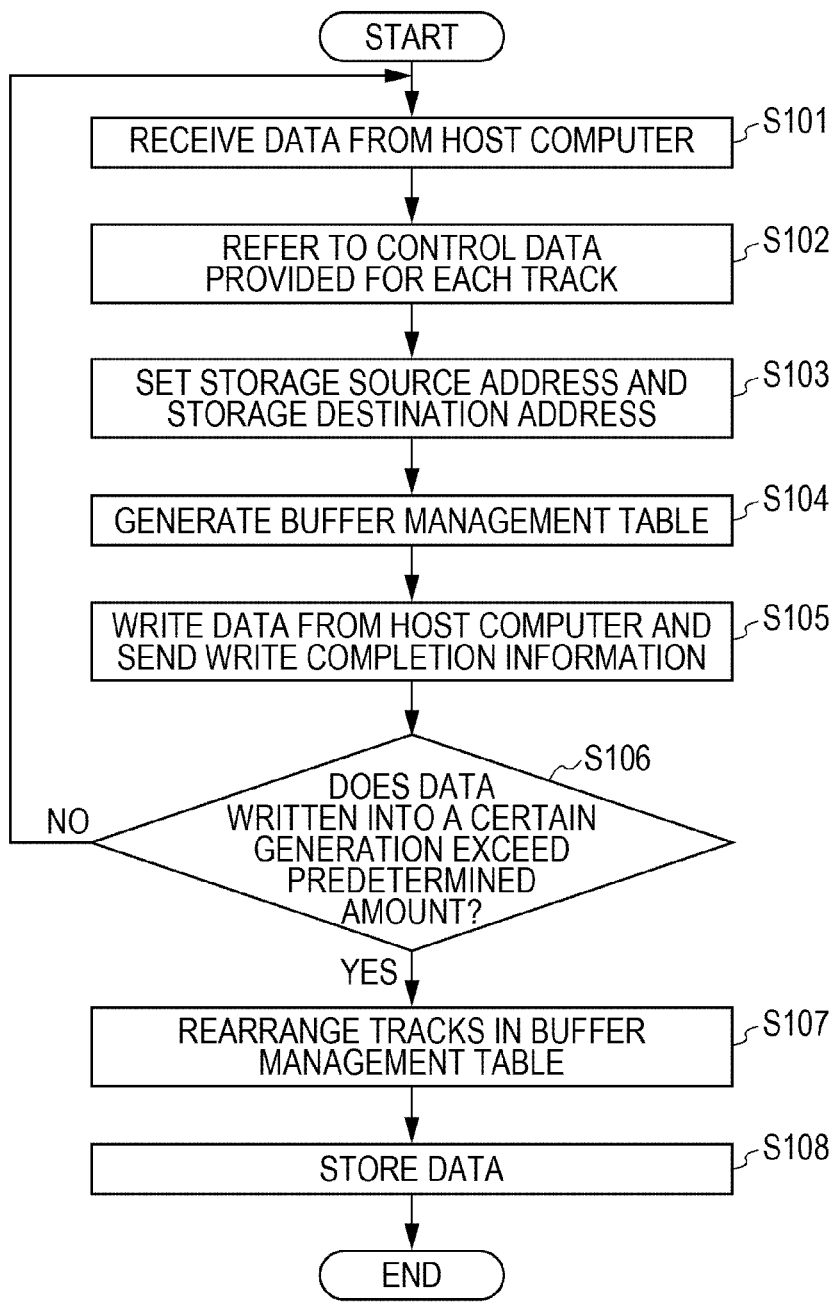
FIG. 10 is a flowchart illustrating a procedure for storage processing performed by a copy source storage apparatus according to the first embodiment.

FIG. 10 is a flowchart illustrating a procedure for storage processing performed by the copy source storage apparatus according to the first embodiment. In operation S101, the data processing unit 121 receives data from the host computer 3. In operation S102, the storage unit 124 refers to control data provided for each track. Then, in operation S103, the storage unit 124 sets the storage source address and the storage destination address.

In operation S104, the buffer management table generating unit 122 generates the buffer management table 113 based on the copy source volume, the copy source LBA, the copy destination volume, and the copy destination LBA. Then, in operation S105, the data processing unit 121 writes data received from the host computer 3 into the logical volume cache 111, and informs the host computer 3 of the completion of writing of the data.

In operation S106, the data processing unit 121 determines whether the amount of data to be written into a certain generation exceeds a given amount. If the data processing unit 121 determines that the amount of data does not exceed the given amount (NO in operation S106), the process returns to operation S101, and the data processing unit 121 receives data from the host computer 3.

If, in operation S106, the data processing unit 121 determines that the amount of data exceeds the given amount (YES in operation S106), the process proceeds to operation S107. In operation S107, the rearranging unit 123 rearranges tracks in the buffer management table 113. Then, in operation S108, the storage unit 124 transfers the data from the logical volume cache 111 to the transfer buffer 112 based on the rearranged buffer management table 113. After this processing, the communication unit 125 sends the data to the storage apparatus 20.

Loading Processing in Copy Destination Storage Device

Figure 11:
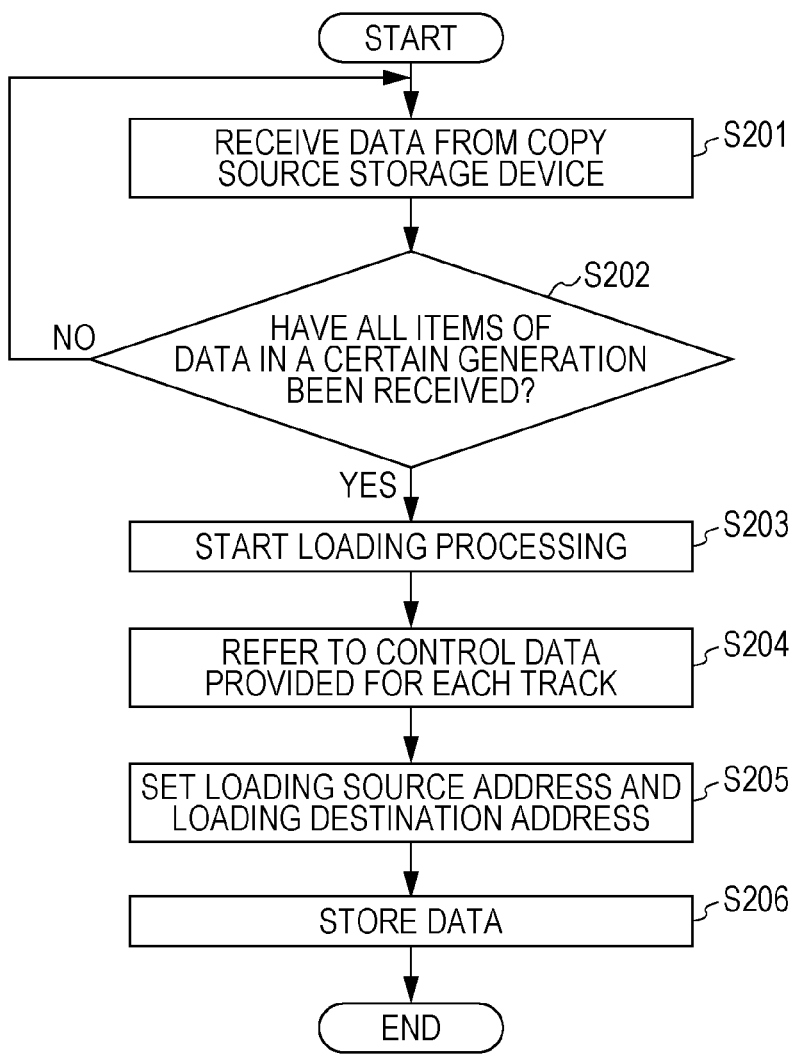
FIG. 11 is a flowchart illustrating a procedure for loading processing performed by a copy destination storage apparatus according to the first embodiment.

FIG. 11 is a flowchart illustrating a procedure of loading processing performed by the copy destination storage apparatus according to the first embodiment. In operation S201, the communication unit 125 receives data from the copy source storage apparatus, and stores the received data in the transfer buffer 112. Then, in operation S202, the loading unit 126 determines whether all groups of data included in a certain generation have been received.

If, in operation S202, the loading unit 126 determines that all groups of data included in a certain generation have been received (YES in operation S202), the process proceeds to operation S203. In operation S203, the loading unit 126 starts loading processing. In contrast, if, in operation S202, the loading unit 126 determines that not all the groups of data included in a certain generation have been received (NO in operation S202), the process returns to operation S201. In operation S201, the loading unit 126 continues to receive data from the copy source storage apparatus.

In operation S204, the loading unit 126 refers to control data provided for each track. In operation S205, the loading unit 126 then sets the loading source address and the loading destination address. Then, in operation S206, the loading unit 126 stores data to be stored in the transfer buffer 112 in the logical volume cache 112, and finishes the loading processing. After this loading processing, the data processing unit 121 transfers data stored in the logical volume cache 111 to a disk.

Advantages of First Embodiment

As described above, according to the first embodiment, it is possible to reduce the time taken to perform loading processing for loading transfer data into a copy destination storage apparatus.

Generally, when tracks are rearranged, a memory area, which serves as a work area, in which tracks are rearranged, has to be provided. An extra operation for copying tracks into the memory has to be performed. In the first embodiment, however, when rearranging tracks, the storage apparatus 10 generates the buffer management table 113, which has a small data amount, and rearranges tracks in the buffer management table 113. The provision of a memory area, which serves as a work area, for rearranging tracks, is made unnecessary, and also, an operation for copying tracks into the memory is performed only once. As a result, in the storage apparatus 10, the efficient use of resources and an improvement in performance are implemented.

Additionally, in the first embodiment, the rearranging unit 123 rearranges tracks in the buffer management table 113 so that the tracks in the copy destination storage apparatus are disposed in ascending order of LBAs. However, the order of tracks in the buffer management table 113 is not restricted to this order. For example, the order of tracks in the buffer management table 113 may be rearranged in descending of LBAs.

Second Embodiment

In the first embodiment, the time taken to perform the loading processing in a copy destination storage apparatus is reduced by rearranging tracks. When performing a remote copying operation while guaranteeing the consistency of the order of data groups, the numbers of records included in tracks to be transferred from the copy source storage apparatus 10 differ depending on the tracks. For example, many records are stored in a certain track, while fewer records are stored in another track.

The storage processing and the loading processing in the transfer buffer 112 are performed in units of tracks, which means that they are performed even in blank (unused) areas in which records are not stored. Additionally, transferring blank areas in which records are not stored to a copy destination storage apparatus increases the communication load.

From this point of view, the copy source storage apparatus 10 may transfer only areas in which records are stored to a copy destination storage apparatus. Accordingly, in a second embodiment, in a storage system, areas in which records are not stored are first removed from tracks to be transferred, and only areas in which records are stored are transferred to a copy destination storage apparatus.

The configuration of the storage system according to the second embodiment is similar to that according to the first embodiment. The configuration of the storage apparatuses according to the second embodiment is also similar to that of the first embodiment.

Configuration of CM

The configuration of a CM 15 according to the second embodiment will be described below with reference to FIG. 12. Elements of the CM 15 similar to those of the first embodiment are designated by like reference numerals, and a detailed explanation thereof will thus be omitted.

Figure 12:
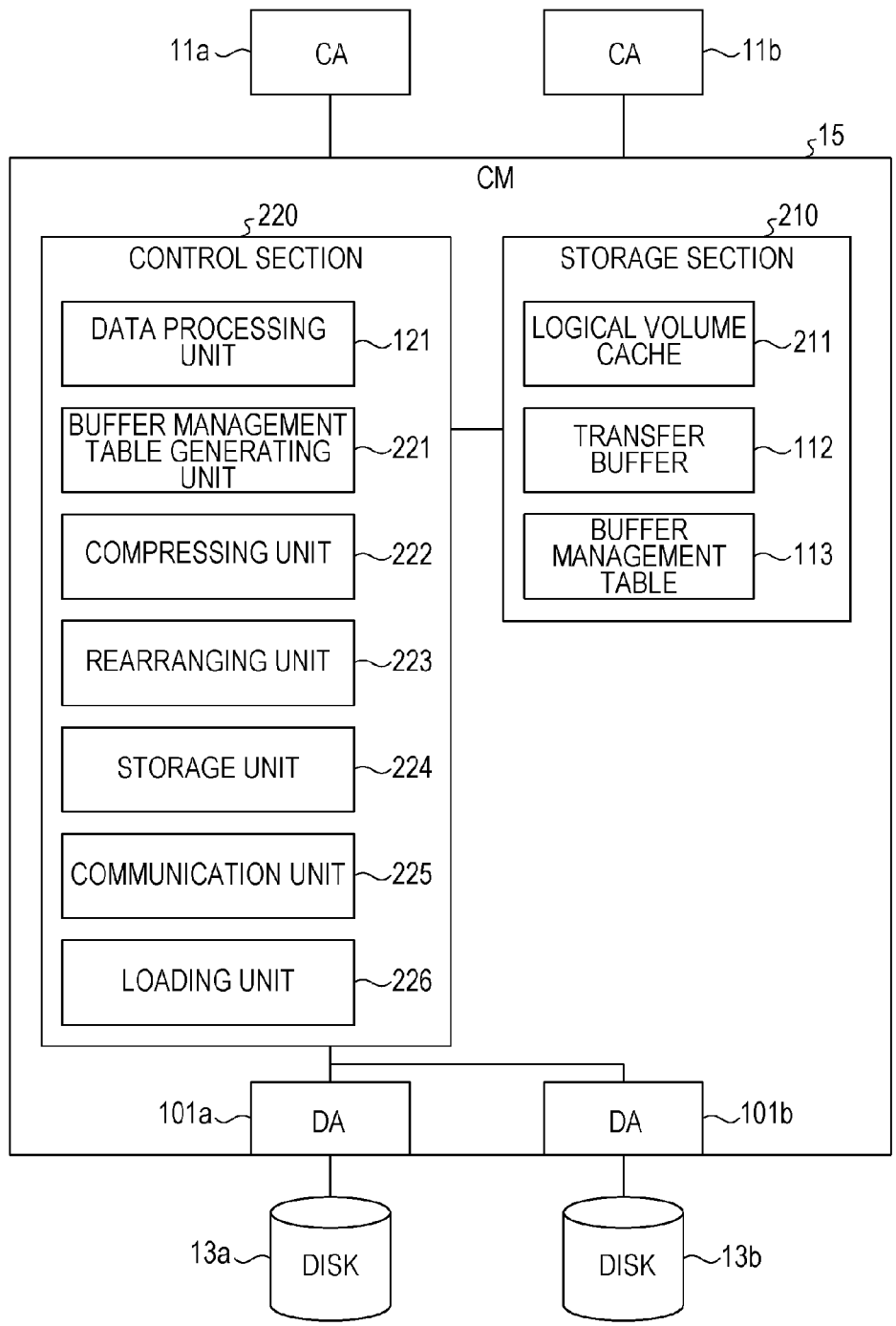
FIG. 12 is a functional block diagram illustrating the configuration of a CM according to a second embodiment.

FIG. 12 is a block diagram illustrating the configuration of the CM 15 according to the second embodiment. The CM 15 includes, as illustrated in FIG. 12, DAs 101a and 101b, a storage section 210, and a control section 220. The storage section 210 is, for example, a DIMM or a DRAM, and includes a logical volume cache 211, a transfer buffer 112, and a buffer management table 113.

As in the logical volume cache 111 of the first embodiment, the logical volume cache 211 serves as a cache memory for the host computer 3 and the disk 13a or 13b. The structure of data stored in the logical volume cache 211 is similar to that of the logical volume cache 111 according to the first embodiment. However, the structure of the logical volume cache 211 is different from that of the logical volume cache 111 in that the following groups of information are added to control data provided for each track of the first embodiment.

In addition to the control data provided for each track of the first embodiment, the control data provided for each track of the second embodiment includes the head record offset, the inter-record offset, and the REC control flag.

The head record offset indicates an offset before the position at which a head record is stored, i.e., an offset before the start position of the head record. In other words, the head record offset indicates an area in which data is not stored before the start position of the head record. The inter-record offset indicates an interval between records. In other words, the inter-record offset indicates a blank area in which data is not stored interposed between records.

The REC control flag indicates whether or not data is compressible. If data is compressible, the REC control flag indicates "compressible". Data is compressible when the record length is fixed.

Figure 13:
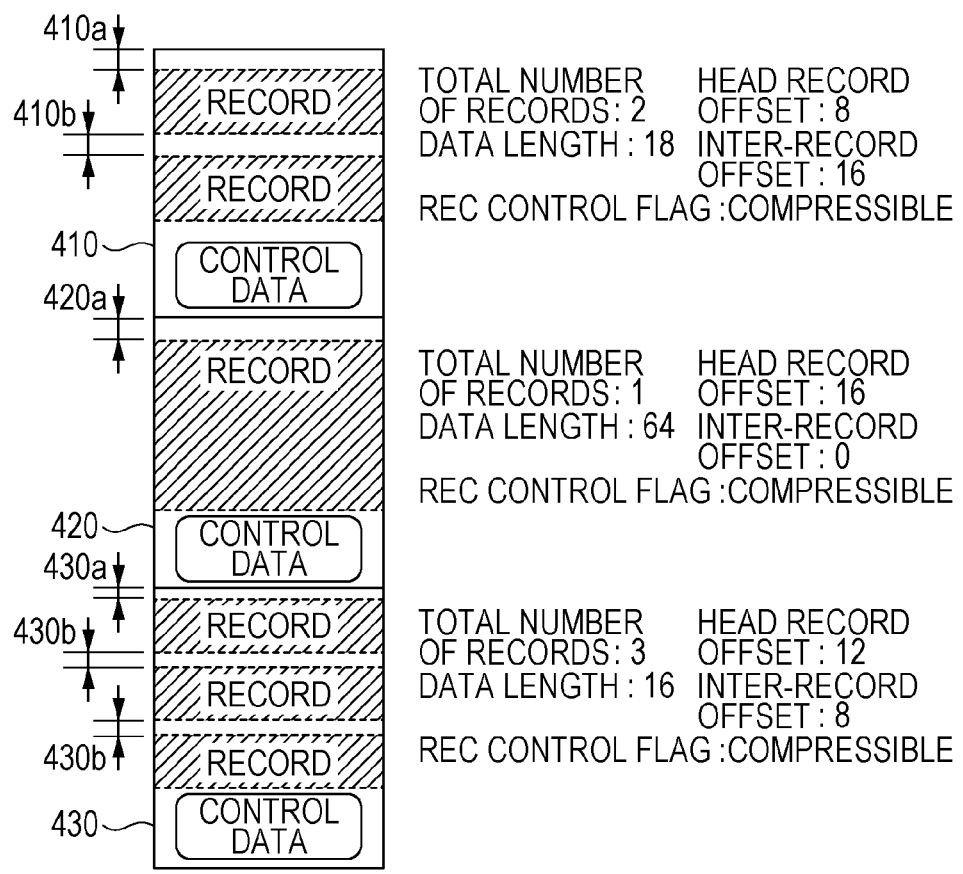
FIG. 13 illustrates an example of control data provided for each track according to the second embodiment.

FIG. 13 illustrates an example of control data provided for each track according to the second embodiment. Control data illustrated in FIG. 13 will be discussed by taking three tracks, i.e., tracks 410, 420, and 430, as examples. As illustrated in FIG. 13, since the track 410 includes two records, the total number of records described in the control data of the track 410 indicates 2. The data length is 18, which means that each record length is 18 LBAs.

In FIG. 13, the head record offset and the inter-record offset are denoted by 410a and 410b, respectively. In the track 410, the head record offset is 8 LBAs, and the inter-record offset is 16 LBAs. Additionally, since the REC control flag indicates "compressible", the track 410 is compressible.

As illustrated in FIG. 13, since the track 420 includes one record, the total number of records described in the control data of the track 420 indicates 1. The data length is 64, which means that each record length is 64 LBAs.

In FIG. 13, the head record offset is denoted by 420a. In the track 420, the head record offset is 16 LBAs, and the inter-record offset is 0 LBAs. Additionally, since the REC control flag indicates "compressible", the track 420 is compressible.

As illustrated in FIG. 13, since the track 430 includes three records, the total number of records described in the control data of the track 430 indicates 3. The data length is 16, which means that each record length is 16 LBAs.

In FIG. 13, the head record offset and the inter-record offset are denoted by 430a and 430b, respectively. In the track 430, the head record offset is 12 LBAs, and the inter-record offset is 8 LBAs. Additionally, since the REC control flag indicates "compressible", the track 430 is compressible.

In this manner, the control data includes internal information concerning tracks, such as the number of records in a track and the data length, thereby allowing the storage apparatuses 10 and 20 to identify only desired areas in a track.

The transfer buffer 112 is similar to that of the first embodiment. The buffer management table 113 is similar to that of the first embodiment.

Referring back to FIG. 12, the control section 220 is, for example, a CPU, and includes a data processing unit 121, the buffer management table generating unit 221, a compressing unit 222, a rearranging unit 223, a storage unit 224, a communication unit 225, and a loading unit 226. FIG. 12 illustrates elements of the control section 220 only related to functions of transferring data to be copied.

The data processing unit 121 has functions similar to those of the data processing unit 121 of the first embodiment. The buffer management table generating unit 221 has functions similar to those of the buffer management table generating unit 122 of the first embodiment.

The compressing unit 222 determines from the REC control flag of the control data whether or not writing data received from the host computer 3 is compressible. If the REC control flag indicates "compressible", the compressing unit 222 determines that the received writing data is compressible. The compressing unit 222 then compresses the buffer management table 113 generated by the buffer management table generating unit 221.

If the buffer management table 113 is generated by the buffer management table generating unit 221, the compressing unit 222 compresses the generated buffer management table 113 in units of tracks. The compressing unit 222 then outputs the compressed buffer management table 113 to the rearranging unit 223. If the compressing unit 222 determines that the receiving writing data is not compressible, it outputs the generated buffer management table 113 by the buffer management table generating unit 221 to the rearranging unit 223 without compressing the buffer management table 113.

Figure 14:
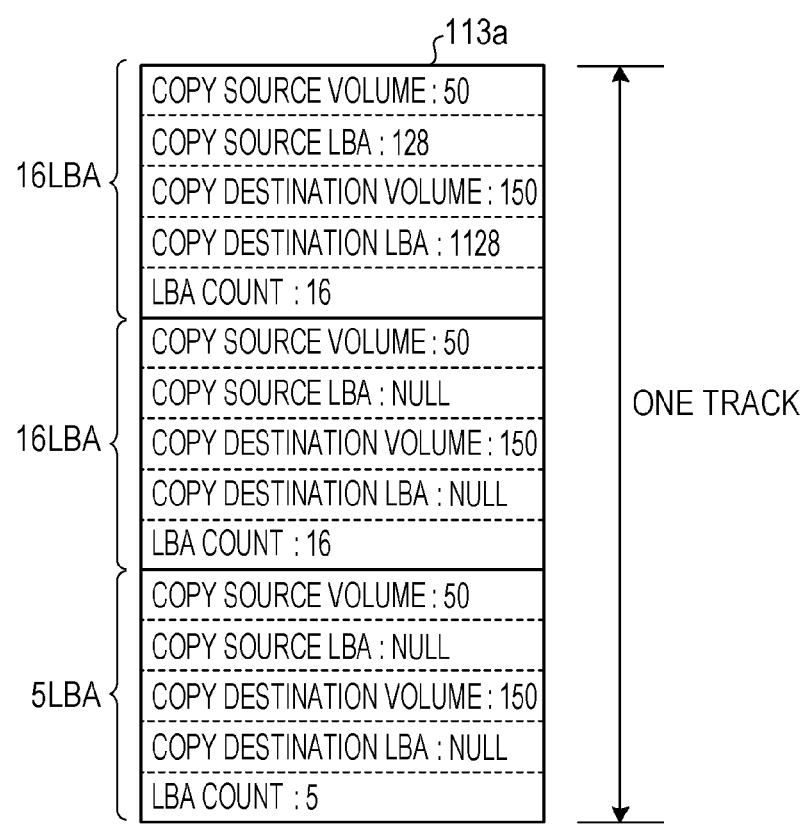
FIG. 14 illustrates an example of a buffer management table generated by a compressing unit.

FIG. 14 illustrates an example of the buffer management table 113 generated by the compressing unit 222. The compressing unit 222 extracts information 113a indicating the first 8 KB from the buffer management table 113 illustrated in FIG. 6. The compressing unit 222 sets the values of the copy source LBA and the copy destination LBA of the subsequent 8 KB information groups to be "NULL". "NULL" indicates that the buffer management table 113 has been compressed.

The compressing unit 222 also calculates the sum of the values of LBA count and sets appropriate values in the LBA count. The sum of the values of LBA count is calculated by the total number of records×data length+control data length. The unit of the data length and the control data length is LBA. The control data is 1 LBA regardless of the record. An example of calculation of the sum of the values of LBA count when the total number of records in one track illustrated in FIG. 14 is 2 and when the data length is 18 will be given. In this case, the compressing unit 222 calculates the sum of the values of LBA count to be 2×18+1=37.

As illustrated in FIG. 14, in the buffer management table 113, 16 LBAs are counted for each 8 KB. The compressing unit 222 sets 16 in each of the first LBA count and the second LBA count. Since the sum of the values of LBA count is 37, the compressing unit 222 sets 5 in the third LBA count as a result of subtracting 32, which have already been counted, from 37. In this manner, the compressing unit 222 compresses information for 96 LBAs included in the buffer management table 113 into 37 LBAs.

The rearranging unit 223 has the following function in addition to the functions of the rearranging unit 123 of the first embodiment. For example, the rearranging unit 223 rearranges the buffer management table 113 generated by the compressing unit 222 in units of tracks so that LBAs in a copy destination storage apparatus are disposed in ascending order.

The storage unit 224 has the following functions in addition to the functions of the storage unit 124 of the first embodiment. For example, if the compressing unit 222 determines that writing data received from the host computer 3 includes a compressible track, the storage unit 224 sets the storage source address and the storage destination address. The storage source address indicates the address of the logical volume cache 211 at which data is stored. The storage destination address indicates the address of the transfer buffer 112 at which data is to be stored.

The storage unit 224 extracts only groups of data in which records are stored from data read from the logical volume cache 211 based on the buffer management table 113 rearranged by the rearranging unit 223 and the control data, and then stores the extracted groups of data in the transfer buffer 112.

An example of processing for storing data by the storage unit 224 will be described below with reference to FIG. 15.

Figure 15:
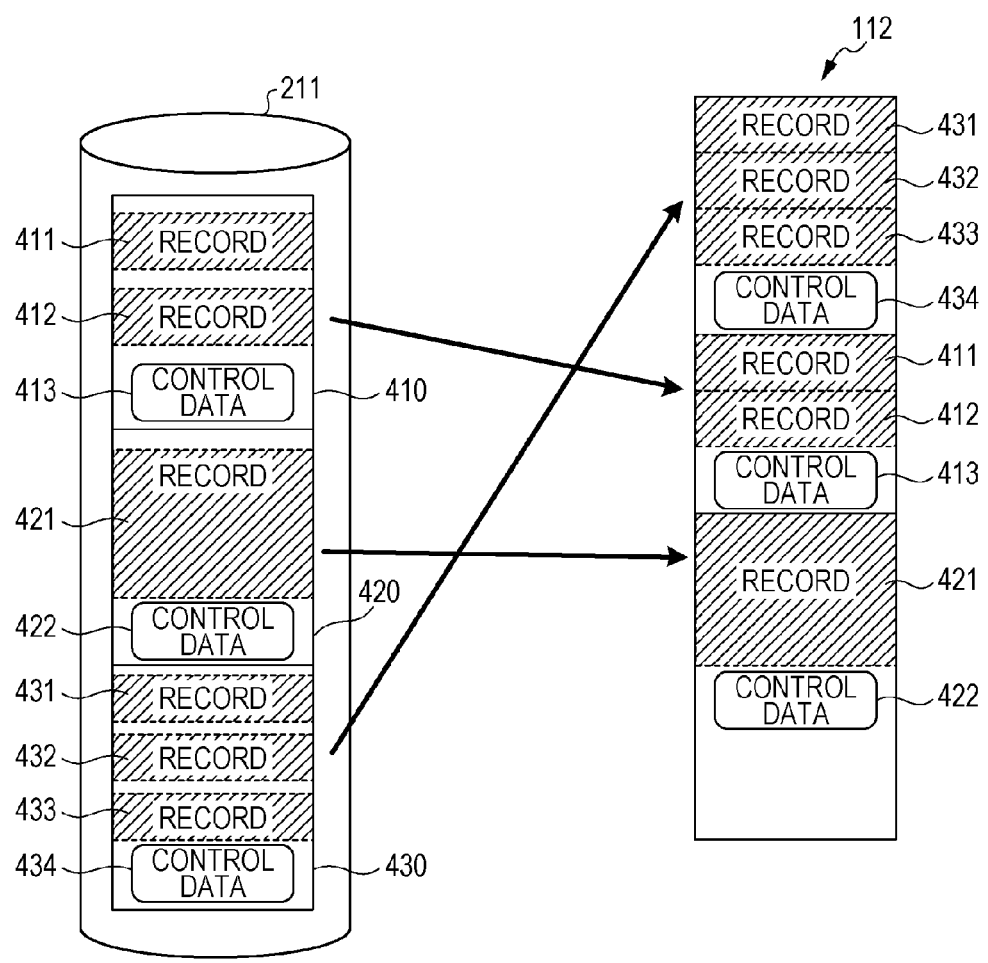
FIG. 15 illustrates an example of processing for storing data by a storage unit.

In the example illustrated in FIG. 15, the storage unit 224 stores three tracks, i.e., tracks 410, 420, and 430, included in the logical volume cache 211 in the transfer buffer 112. A description will be given, assuming that the storage unit 224 utilizes the buffer management table 113 rearranged by the rearranging unit 223.

As illustrated in FIG. 15, the storage unit 224 reads the track 430 from the logical volume cache 211, determines an area in which records are not stored from the control data, and stores only areas of the track 430 in which records are stored in the transfer buffer 112. That is, the storage unit 224 stores records 431, 432, and 433 and control data 434 of the track 430 in the transfer buffer 112. In this case, the storage unit 224 stores the track 430 in the storage destination address which has been set.

Subsequently, the storage unit 224 reads the track 410 from the logical volume cache 211 and stores the track 410 at a position after the control data 434 of the track 430 in the transfer buffer 112. That is, the storage unit 224 stores records 411 and 412 and control data 413 of the track 410 in the transfer buffer 112.

The storage unit 224 then reads the track 420 from the logical volume cache 211, and stores the track 420 at a position after the control data 413 of the track 410 in the transfer buffer 112. That is, the storage unit 224 stores a record 421 and control data 422 of the track 420 in the transfer buffer 112.

Upon completion of storage of data for one generation in the transfer buffer 112, the storage unit 224 instructs the communication unit 125 to send data stored in the transfer buffer 112 to the copy destination storage apparatus 20.

Upon receiving from the storage unit 224 information that data for one generation has been stored in the transfer buffer 112, the communication unit 225 reads the data stored in the transfer buffer 112 and sends the read data to the copy destination storage apparatus 20. The communication unit 225 also sends the buffer management table 113 rearranged by the rearranging unit 223 to the copy destination storage apparatus 20.

Figure 16:
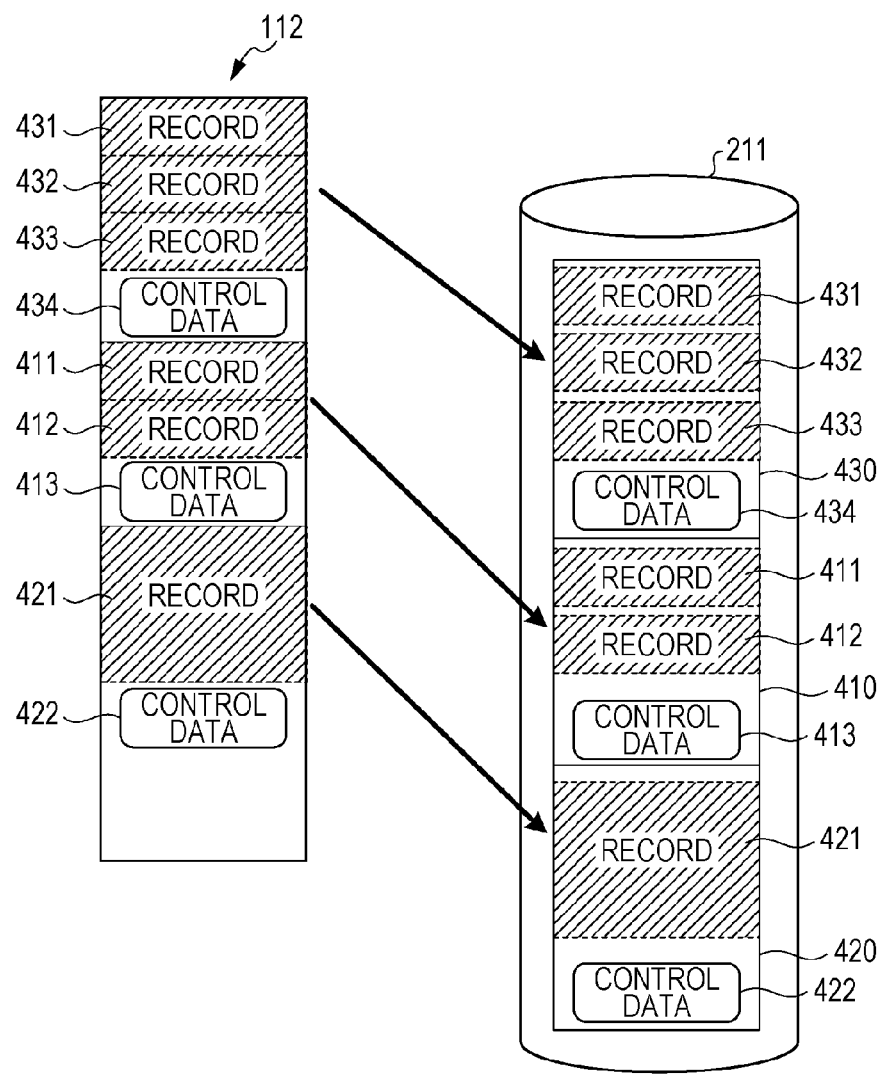
FIG. 16 illustrates an example of processing for loading data by a loading unit.

The loading unit 226 specifies areas in which records are stored and areas in which records are not stored by referring to the buffer management table 113 rearranged by the rearranging unit 223 and control data. The loading unit 226 then loads the specified areas from the transfer buffer 112 into the logical volume cache 211. FIG. 16 illustrates an example of processing for loading data by the loading unit 226.

In the example illustrated in FIG. 16, the records 431, 432, and 433 and control data 434 are stored in the transfer buffer 112. The records 411 and 412 and control data 413 are also stored in the transfer buffer 112. The record 412 and control data 422 are also stored in the transfer buffer 112.

The loading unit 226 reads the records 431, 432, and 433, and the control data 434 from the transfer buffer 112, and loads them into the logical volume cache 211 as the track 430 including the head record offset and the inter-record offset.

Similarly, the loading unit 226 reads the records 411 and 412 and the control data 413 from the transfer buffer 112, and loads them into the logical volume cache 211 as the track 410 including the head record offset and the inter-record offset. The loading unit 226 also reads the record 421 and the control data 422 from the transfer buffer 112, and loads them into the logical volume cache 211 as the track 420 including the head record offset and the inter-record offset.

Processing Procedures Performed by Storage Devices

Processing procedures performed by storage apparatuses according to the second embodiment will be described below with reference to FIGS. 17 and 18. Storage processing performed by a copy source storage apparatus will be discussed with reference to FIG. 17. Loading processing performed by a copy destination storage apparatus will be discussed with reference to FIG. 18.

Storage Processing in Copy Source Storage Device

Figure 17:
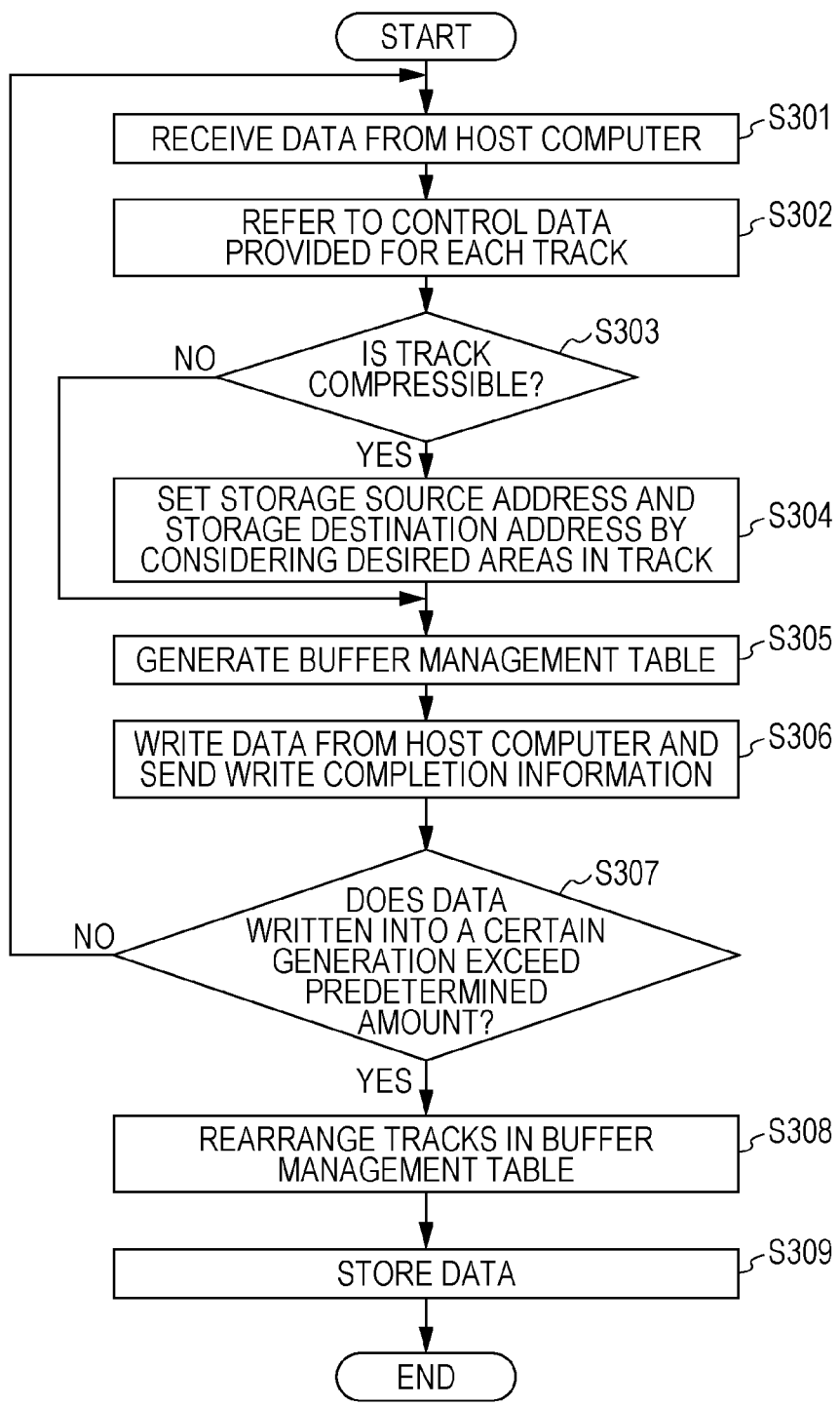
FIG. 17 is a flowchart illustrating a procedure for storage processing performed by a copy source storage apparatus according to the second embodiment.

FIG. 17 is a flowchart illustrating a procedure for storage processing performed by a copy source storage apparatus according to the second embodiment. In operation S301, the data processing unit 121 receives data from the host computer 3. After operation S301, the buffer management table generating unit 221 generates the buffer management table 113 based on the copy source volume, the copy source LBA, the copy destination volume, the copy destination LBA specified by the host computer 3. In operation S302, the compressing unit 222 refers to control data provided for each track. In operation S303, the compressing unit 222 determines whether each of the tracks is compressible.

If, in operation S303, the compressing unit 222 determines that a track is compressible (YES in operation S303), the process proceeds to operation S304. In operation S304, the storage unit 224 sets the storage source address and the storage destination address by considering desired areas in each track.

If, in operation S303, the compressing unit 222 determines that a track is not compressible (NO in operation S303), or after operation S304, the process proceeds to operation S305. In operation S305, the compressing unit 222 generates a buffer management table. If the compressing unit 222 determines that a track is compressible, it compresses the buffer management table 113 generated by the buffer management table generating unit 221 and outputs the generated buffer management table 113 to the rearranging unit 223. In contrast, if the compressing unit 222 determines that a track is not compressible, it outputs the buffer management table 113 generated by the buffer management table generating unit 221 to the rearranging unit 223 without compressing the buffer management table 113.

Then, in operation S306, the data processing unit 121 writes the data received from the host computer 3 into the logical volume cache 211, and informs the host computer 3 of completion of writing of the data.

In operation S307, the data processing unit 121 determines whether the amount of data written into a certain generation exceeds a given amount. If, in operation S307, the data processing unit 121 determines that the amount of data written into a certain generation does not exceed the given amount (NO in operation S307), the process returns to operation S301. In operation S301, the data processing unit 121 continues to receive data from the host computer 3.

If, in operation S307, the data processing unit 121 determines that the amount of data written into a certain generation exceeds the given amount (YES in operation S307), the process proceeds to operation S308. In operation S308, the rearranging unit 223 rearranges the buffer management table 113 generated by the compressing unit 222. Then, in operation S309, the storage unit 224 transfers the data from the logical volume cache 211 to the transfer buffer 112 and stores the data therein based on the buffer management table 113 and control data. After this storage processing, the communication unit 125 sends the data to the storage apparatus 20.

Loading Processing in Copy Destination Storage Device

Figure 18:
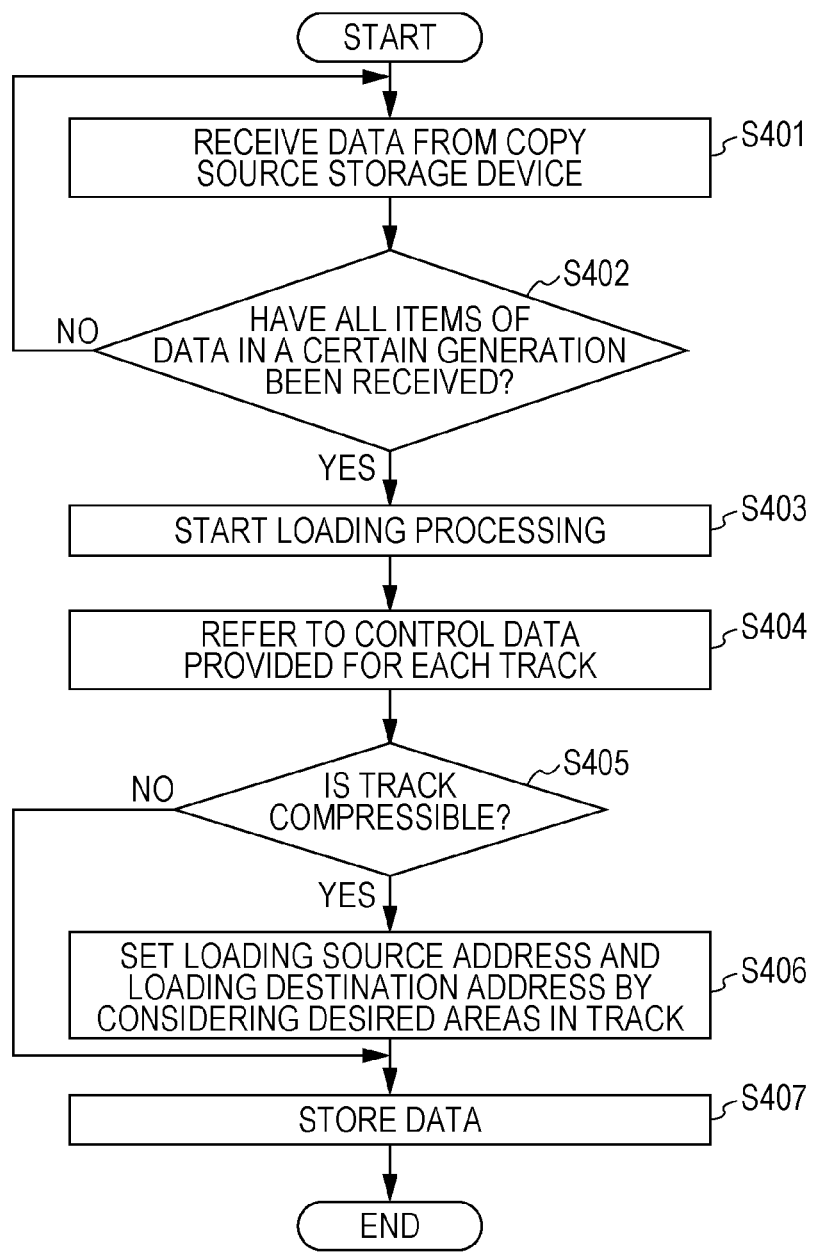
FIG. 18 is a flowchart illustrating a procedure for loading processing performed by a copy destination storage apparatus according to the second embodiment.

FIG. 18 is a flowchart illustrating a procedure for loading processing performed by a copy destination storage apparatus according to the second embodiment. In operation S401, the communication unit 125 receives data from a copy source storage apparatus, and stores the received data in the transfer buffer 112. Then, in operation S402, the loading unit 226 determines whether all groups of data included in a certain generation have been received. If, in operation S402, the loading unit 226 determines that all the groups of data have been received (YES in operation S402), the process proceeds to operation S403. In operation S403, the loading unit 226 starts loading processing.

In operation S404, the loading unit 226 refers to control data provided for each track. Then, in operation S405, the loading unit 226 determines whether each of the tracks is compressible. If, in operation S405, the loading unit 226 determines that a track is compressible (YES in operation S405), the process proceeds to operation S406. In operation S406, the loading unit 226 sets the loading source address and the loading destination address by considering desired areas in each track.

If, in operation S405, the loading unit 226 determines that a track is not compressible, or after operation S406, the process proceeds to operation S407. In operation S407, the loading unit 226 transfers data from the transfer buffer 112 to the logical volume cache 211 and stores the data therein. After this loading processing, the data processing unit 121 stores the data in the logical volume cache 211 in a disk.

Advantages of Second Embodiment

As described above, in the second embodiment, data is first compressed and is then transferred, thereby making it possible to reduce the communication load and also to save the time taken to remove areas in which records are not stored. More specifically, only areas including records are stored in the transfer buffer 112, only compressed track information is transferred, and only a minimal number of records are loaded from the transfer buffer 112. As a result, in the storage system of the second embodiment, a significant improvement in performance and a considerable cost reduction are expected, compared with the related art.

In the second embodiment, the copy source storage apparatus compresses data and rearranges the compressed data, and then transfers the compressed data to the copy destination storage apparatus. However, this is only an example. For example, the copy source storage apparatus may transfer compressed data to the copy destination storage apparatus without rearranging the compressed data. Alternatively, after rearranging the buffer management table 113, the copy source storage apparatus may store data in the transfer buffer 112 based on control data and the rearranged buffer management table 113.

Third Embodiment

Various modes other than the first and second embodiments may be carried out. In a third embodiment, aspects other than the first and second embodiments will be described.

System Configuration

Among the processing operations described in the first and second embodiments, the entirety or part of processing operations which are executed automatically may also be executed manually. Conversely, the entirety or part of processing operations which are executed manually in the above-described first or second embodiment may also be executed automatically by using a known method.

Additionally, the processing procedures, control procedures, and specific names of the elements described in the specification and the drawings may be changed as desired unless otherwise specifically stated. Information groups stored in the storage sections as illustrated in the drawings are examples only, and information groups do not have to be stored as illustrated.

In the first embodiment, the rearrangement of tracks in a storage system to which a main frame is connected has been discussed. However, this is merely an example, and the disclosed technology is not restricted to this configuration. For example, the technology disclosed in the first embodiment may be applied to an open system to which a Unix/IA server is connected.

Figure 19:
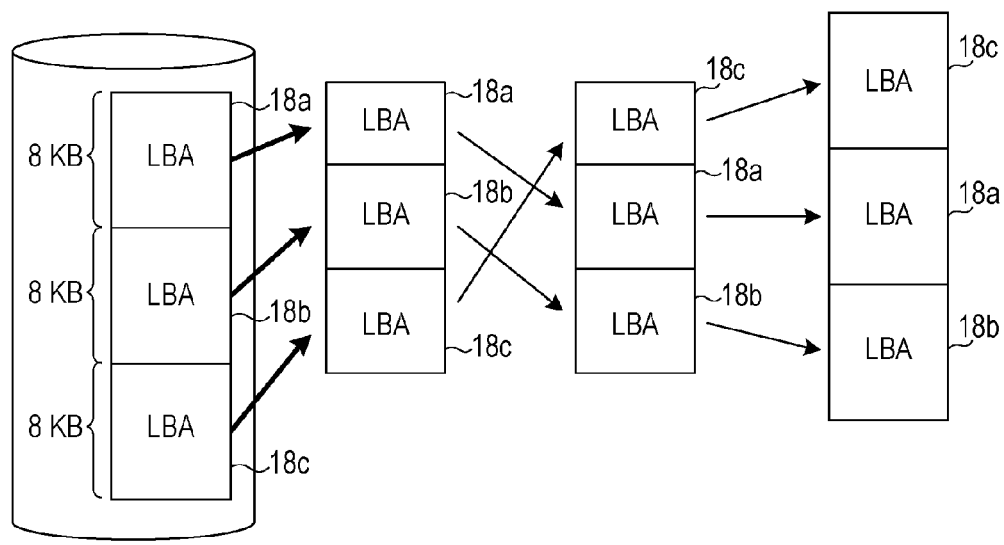
FIG. 19 illustrates an example of the rearrangement of tracks in an open system.

An example of the rearrangement of tracks in an open system will be described below with reference to FIG. 19. In the example illustrated in FIG. 19, three data groups, i.e., LBA 18*a*, LBA 18*b*, and LBA 18*c*, are rearranged. The ascending order of LBA 18*a*, LBA 18*b*, and LBA 18*c* in a copy destination storage apparatus is LBA 18*c*, LBA 18*a*, and LBA 18*b*.

In the open system, data is stored in the logical volume cache 111 in units of LBAs. Accordingly, the rearranging unit 123 rearranges data in units of LBAs so that LBAs are disposed in ascending order in a copy destination storage apparatus. A description will be given, assuming that LBA 18*a*, LBA 18*b*, and LBA 18*c* are stored in the logical volume cache 111 and that the buffer management table 113 has been generated in the order of LBA 18*a*, LBA 18*b*, and LBA 18*c* by the buffer management table generating unit 122.

The rearranging unit 123 rearranges the order of LBA 18*a*, LBA 18*b*, and LBA 18*c* in the buffer management table 113 to the order of LBA 18*c*, LBA 18*a*, and LBA 18*b* so that the LBAs are disposed in ascending order in the copy destination storage apparatus. Then, the storage unit 124 stores data in the transfer buffer 112 in the order of LBA 18*c*, LBA 18*a*, and LBA 18*b*. In this manner, the copy source storage apparatus rearranges data in units of LBAs and then transfers the rearranged data to a copy destination storage apparatus. Accordingly, in the copy destination storage apparatus, the time taken to move a disk head is reduced, and loading processing becomes faster.

In the above-described first and second embodiments, in response to a request to write data from the host computer 3, the data is written into one of the disks 13*a* through 14*b*. Then, when sending the data in response to a request to send data to the storage apparatus 20 from the host computer 3, tracks of the data are rearranged. Alternatively, before writing data into one of the disks 13*a* through 14*a* in response to a request form the host computer 3, tracks of the data may be rearranged.

The elements illustrated in the drawings do not have to be physically configured as illustrated. For example, the copy source storage apparatus 10 may include the data processing unit 121, the buffer management table generating unit 122, the rearranging unit 123, the storage unit 124, and the communication unit 125. The copy destination storage apparatus 20 may include the data processing unit 121, the communication unit 125, and the loading unit 126.

In the storage apparatus 10, the buffer management table generating unit 122 and the rearranging unit 123 illustrated in FIG. 3 may be integrated. The buffer management table generating unit 221 and the compressing unit 222 illustrated in FIG. 12 may be integrated. The entirety or part of the processing functions provided in each of the storage apparatuses 10 and 20 may be implemented by a CPU and programs which are interpreted and executed by the CPU, or may be implemented as hardware formed of a wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage apparatus, comprising:
a memory that stores data groups, each of the data groups being divided into a first area in which data from an information processing apparatus is written, a second area in which data from the information processing apparatus is not written, and a third area in which area information indicating positions of the first area and the second area is written;
a copy data generating unit that removes the second area based on the area information and generates copy data groups from the data groups based on the data written in the first area and the area information written to the third area;
a rearranging unit that rearranges a transmission group order of the copy data groups generated by the copy data generating unit based on each of storage positions in a storage device provided in a copy destination storage apparatus in which each of the copy data groups is to be stored; and
a transmitting unit that transmits the copy data groups rearranged by the rearranging unit to the copy destination storage apparatus.

2. The storage apparatus according to claim 1, further comprising:
a position information generating unit that generates position information in which each of the positions in the storage device provided in the copy destination storage apparatus in which each of the copy data groups is to be stored is associated with an identifier of each of the copy data groups,
wherein the rearranging unit rearranges a transmission group order of the position information based on each of the positions in the storage device provided in the copy destination storage apparatus in which each of the copy data groups is to be stored, and rearranges a transmission group order of the copy data groups based on the rearranged position information, and
wherein the transmitting unit transmits the copy data groups and the position information whose transmission group orders are rearranged by the rearranging unit to the copy destination storage apparatus.

3. A control method for a storage apparatus, the storage apparatus including a memory that stores data groups, each of the data groups being divided into a first area in which data from an information processing apparatus is written, a second area in which data from the information processing apparatus is not written, and a third area in which area information indicating positions of the first area and the second area is written, the control method comprising:
removing the second area based on the area information;
generating copy data groups from the data groups based on the data written to the first area and the area information written to the third area;
rearranging a transmission group order of the copy data groups based on each of storage positions in a storage device provided in a copy destination storage apparatus in which each of the copy data groups is to be stored; and transmitting the copy data groups whose transmission group order is rearranged to the copy destination storage apparatus.

4. The control method for a storage apparatus according to claim 3, further comprising:

generating position information in which each of the positions in the storage device provided in the copy destination storage apparatus in which each of the copy data groups is to be stored is associated with an identifier of each of the copy data groups;

rearranging a transmission group order of the position information based on each of the positions in the storage device provided in the copy destination storage apparatus in which each of the copy data groups is to be stored;

rearranging a transmission group order of the copy data groups based on the rearranged position information; and transmitting the copy data groups and the position information whose transmission group orders are rearranged by the rearranging unit to the copy destination storage apparatus.

5. A storage system, comprising:

an information processing apparatus; and a copy source storage apparatus that receives writing of data from the information processing apparatus and that transmits data groups to a copy destination storage apparatus which is connected to the copy source storage apparatus, the copy source storage apparatus including a memory that stores the data groups, each of the data groups being divided into a first area in which data from an information processing apparatus is written, a second area in which data from the information processing apparatus is not written, and a third area in which area information indicating positions of the first area and the second area is written, a copy data generating unit that removes the second area based on the area information and generates copy data groups from the data groups based on the data written in the first area and the area information written to the third area, a rearranging unit that rearranges a transmission group order of the copy data groups generated by the copy data generating unit based on each of storage positions in a storage device provided in a copy destination storage apparatus in which each of the copy data groups is to be stored, and a transmitting unit that transmits the copy data groups rearranged by the rearranging unit to the copy destination storage apparatus, the copy destination storage apparatus including a receiving unit that receives the copy data groups, whose transmission group order of the copy data groups is rearranged based on each of storage positions in the storage device in which each of the copy data groups is to be stored, from the copy source storage apparatus, and a writing unit that writes the received copy data groups into the storage device.

* * * * *